United States Patent
Homma et al.

[11] Patent Number: 6,124,891
[45] Date of Patent: *Sep. 26, 2000

[54] EXPOSURE CONTROL DEVICE

[75] Inventors: Hideo Homma, Tokyo; Akihiro Fujiwara; Hirofumi Suda, both of Kanagawa-ken; Kunihiko Yamada, Tokyo; Masamichi Toyama, Kanagawa-ken; Kunio Imai, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/278,645

[22] Filed: Jul. 21, 1994

Related U.S. Application Data

[62] Division of application No. 08/104,372, Aug. 9, 1993, abandoned, which is a continuation of application No. 07/582,798, Sep. 13, 1990, Pat. No. 5,272,538, which is a continuation of application No. 07/460,278, Jan. 2, 1990, abandoned, which is a continuation of application No. 07/264,204, Oct. 28, 1988, abandoned.

[30] Foreign Application Priority Data

| Nov. 4, 1987 | [JP] | Japan | 62-277382 |
| Nov. 4, 1987 | [JP] | Japan | 62-277383 |
| Nov. 4, 1987 | [JP] | Japan | 62-277384 |
| Nov. 4, 1987 | [JP] | Japan | 62-277385 |

[51] Int. Cl.$^7$ .................................................. H04N 5/238
[52] U.S. Cl. ............................................. 348/364; 348/363
[58] Field of Search ..................................... 348/362, 363, 348/364, 366, 699, 700; 354/410, 421; 396/95; H04N 5/238, 5/243

[56] References Cited

U.S. PATENT DOCUMENTS

| 4,535,364 | 8/1985  | Hirobe        | 348/364 |
| 4,551,764 | 11/1985 | Ogawa         | 348/363 |
| 4,872,058 | 10/1989 | Baba et al.   | 348/349 |
| 4,987,482 | 1/1991  | Imai et al.   | 348/364 |
| 5,272,538 | 12/1993 | Homma et al.  | 348/345 |

*Primary Examiner*—Tuan Ho
*Attorney, Agent, or Firm*—Robin, Blecker & Daley

[57] ABSTRACT

An exposure control device for performing exposure control on the basis of a video signal obtained from a light measuring area set within an image sensing plane is provided with a determining circuit which determines the position of a photographed object within the image sensing plane from the values of a specific component of the video signal obtained from the inside and outside of a detection area the position of which is variably set within the image sensing plane. The light measuring area is set in the object's position within the image sensing plane detected by the determining circuit. The exposure control device is provided further with a changing circuit which detects the size of the object on the image sensing plane and changes the size of the light measuring area accordingly, and a weighting circuit which performs for light measurement a weighting operation on video signals obtained from the inside and outside of the light measuring area.

25 Claims, 22 Drawing Sheets

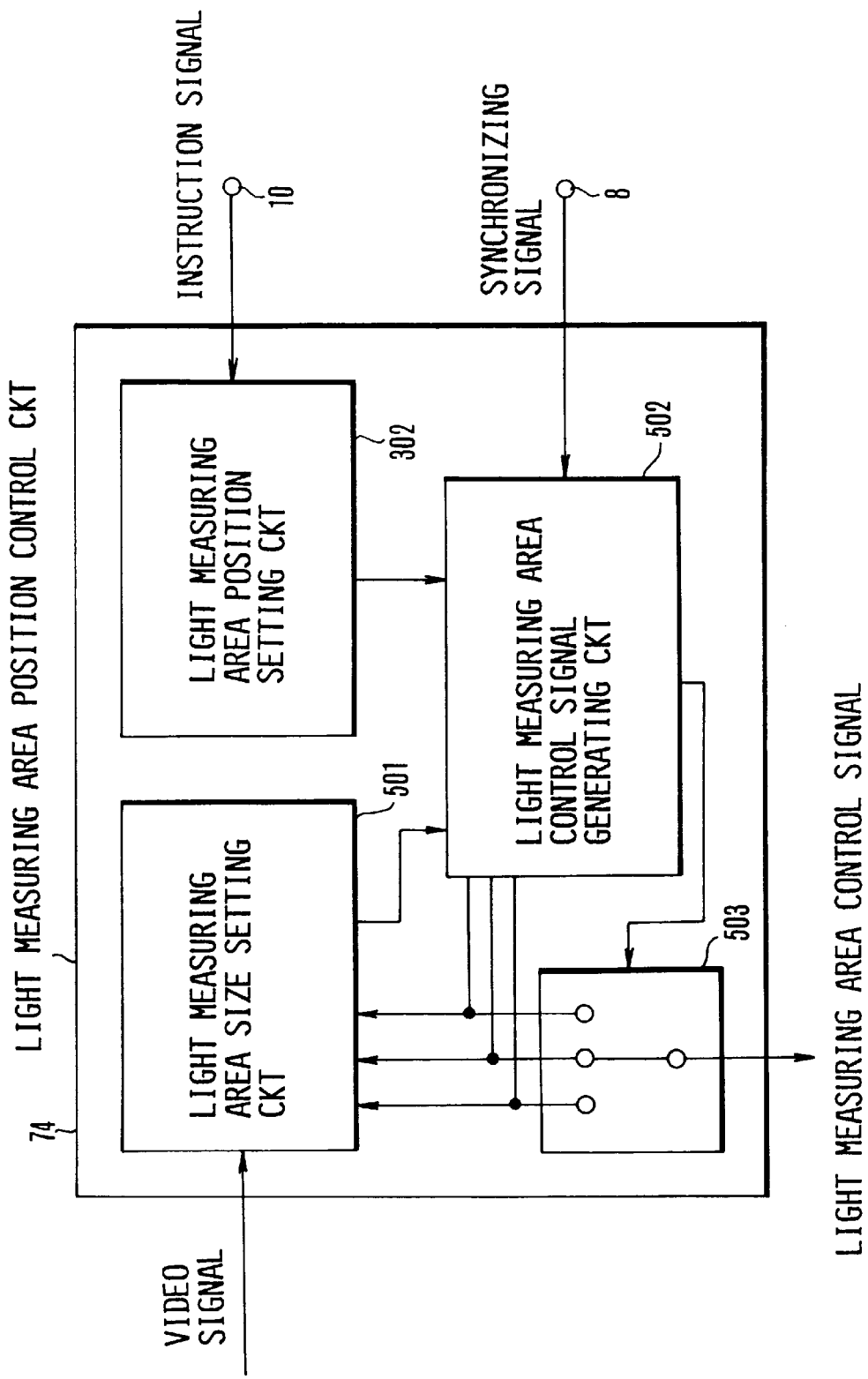

EXPOSURE CONTROL DEVICE

This application is a division of application Ser. No. 08/104,372, filed Aug. 9, 1993, now abandoned which is a continuation of Ser. No. 07/582,798, filed Sep. 13, 1990, now U.S. Pat. No. 5,272,538, which is a continuation of Ser. No. 07/460,278, filed Jan. 2, 1990, now abandoned, which is a continuation of Ser. No. 07/264,204, filed Oct. 28, 1988, now abandoned.

BACKGROUND OF THE INVENTION

1. Field of the Invention

This invention relates to an improvement in an exposure control device to be disposed within a camera such as video camera or the like.

2. Description of the Related Art

The degree of exposure in a video camera is determined by exposure time and a diaphragm aperture. Generally, the exposure time is one field period, which is ⅟₆₀ sec in the NTSC system and ⅟₅₀ sec in the PAL system. Therefore, exposure control is generally performed by adjusting the diaphragm of an optical system. In cases where the camera is provided with an image sensor which is capable of acting as an electronic shutter, the exposure time is controllable by controlling the electronic shutter.

As apparent from the foregoing, the exposure control device of this kind is arranged to perform feedback control over the diaphragm of the optical system or the electronic shutter of the image sensor, or an AGC circuit or the like, inserted in an image signal route in such a way as to keep a video signal level unvarying. FIG. 1 shows an example of the conventional exposure control device. The illustration includes a lens 1; an exposure control circuit 2 which is arranged to control the degree of exposure by controlling a diaphragm, or an electronic shutter in case that the video camera is using a solid-state image sensor; the image sensor 3; a signal level detecting circuit 4 which generates an exposure control signal; a reference power source 5 which generates a level signal corresponding to a desired exposure control value; and a video signal output terminal 6.

An object's image which passes through the lens 1 comes to the image sensor 3 to be formed on the image sensing plane of the image sensor 3. The image sensor 3 converts the image into a video signal. The video signal is supplied to the signal level detecting circuit 4. Further, the video signal is supplied also to a signal processing circuit which is not shown but is arranged to form a television video signal. The image is thus converted into a television video signal in conformity to the standard specifications of the NTSC or PAL system or the like. Meanwhile, the signal level detecting circuit 4 forms an exposure control signal on the basis of the video signal received. The exposure control signal is supplied to the exposure control circuit 2. Then, the exposure control circuit 2 uses this exposure control signal as a measure for an exposure. The circuit 2 causes the signal to coincide always with the signal of a given level value coming from the power source 5 which generates the level signal corresponding to the desired exposure control value.

The signal level detecting circuit 4 has been arranged to measure light by one of the following different methods including (1) full plane average light measurement and (2) peak light measurement. However, these methods have the following drawbacks respectively:

In the light measuring method (1): The light is measured by the average value of luminance obtained on the full image (sensing) plane. Therefore, if a large portion of the image plane is occupied by a bright matter such as a light source, a main photographed object would appear in an excessively dark state. If the background becomes dark, the main object would appear in a too bright state failing to show its details.

In the case of the light measuring method (2): Light measurement is performed according to the peak value of the luminance obtained on the image plane. Therefore, the whole image plane would become excessively dark if some high luminance matter comes to occupy even a small portion of the image plane.

The drawbacks of the methods (1) and (2) can be mitigated to a certain degree by a center-weighted light measuring method (3). In the case of this method (3), however, the exposure changes when the main object moves out of the middle part, or the light measuring spot, of the image sensing plane either due to a slight movement of the camera or due to the movement of the object. In that event, the brightness of the image plane changes to give an unnatural impression. This drawback is salient especially where there is an excessive contrast between the object and the background. Another drawback of this light measuring method lies in that: In cases where the size of the object within the image plane is considerably smaller than that of a light measuring area which occupies a given portion of the image plane, exposure control on the basis of an image signal obtained from the light measuring area would be affected by the background. Conversely, if the object is much larger than the size of the light measuring area within the image plane, exposure control cannot be adequately accomplished with the image signal of the light measuring area as it would be impossible to obtain a sufficient amount of information for the whole image plane.

Further, even if an exposure control device is arranged to be capable of coping with changes taking place in the position and size of the object's image within the image plane, any object other than the main photographed object would likely be disregarded. Therefore, while the device may give the optimum degree of exposure for the main object, the exposure is not always the best for the whole image plane.

SUMMARY OF THE INVENTION

This invention is directed to the solution of the above stated problems of the prior art. It is therefore a first object of the invention to provide an exposure control device which is capable of always giving optimum exposures irrespectively of the position of the object within the image plane.

To attain the above stated object, an exposure control device which is arranged as a preferred embodiment of this invention comprises: Computing means for computing information on a difference in a specific frequency component between video signals obtained from the inside and outside of a detection area which is movable within an image plane; determining means for determining the position of a photographed object within the image plane on the basis of the difference information obtained by the computing means at different positions of the detection area within the image plane; and light measuring area setting means for setting a light measuring area at the position of the object determined by the determining means. When a change occurs in the position of the object within the image plane, the light measuring area is shifted to the new position of the object. Therefore, the device is capable of giving always optimum exposures.

It is another object of the invention to provide an exposure control device which always gives optimum exposures even in the event when the size of an object changes within the image plane of the camera.

To attain this object, an exposure control device which is arranged as another preferred embodiment of the invention comprises: computing means for computing information on a difference in a specific frequency component between video signals obtained from the inside and outside of a detection area which is set in a variable size on an image plane; determining means for determining the size of an object within the image plane on the basis of the difference information obtained by the computing means at varied sizes of the detection area; and light measuring area setting means for changing the size of a light measuring area according to the size of the object determined by the determining means. The light measuring area is thus arranged according to the size of the photographed object as determined by the determining means. In other words, the light measuring area becomes larger or smaller according to changes occurring in the size of the image of the object, so that the exposure can be made always in the optimum degree for the object.

It is a further object of the invention to provide an exposure control device which is capable of giving always optimum exposures even in cases where the size and position of an object happen to vary within an image sensing plane.

To attain the above stated object, an exposure control device arranged as a further preferred embodiment of the invention comprises: first computing means for computing information on a difference in a specific frequency component between video signals obtained from the inside and outside of a detection area respectively at different positions of the detection area which is arranged to be set in a variable size and in a variable position on an image plane; second computing means for computing information on a difference in a specific frequency component between video signals obtained from the inside and outside of the detection area respectively at different sizes of the detection area; determining means for determining the position and size of the object within the image plane on the basis of the difference information computed by the first and second computing means respectively; and light measuring area control means for controlling the size and position of a light measuring area within the image plane according to the position and size of the object determined by the determining means. The light measuring area is thus arranged to be shifted to the position of the object within the image plane and to have the size thereof adjusted to the size of the object on the image plane. Therefore, the device always gives optimum exposures even when the size and position of the object change within the image plane.

It is a further object of the invention to provide an exposure control device which is capable of giving always optimum exposures irrespectively of the position of the image of a main photographed object within an image plane and also irrespectively of the relation of the object to the background.

To attain the above stated object, an exposure control device arranged as a further embodiment of this invention comprises: computing means for computing information on a difference in a specific frequency component between video signals obtained from the inside and outside of a detection area set within an image plane; determining means for determining the position of an object within the image plane according to the difference information computed by the computing means; light measuring area setting means for setting a light measuring area at the position of the object determined by the determining means; exposure detecting means for detecting information on light exposure to be made within the light measuring area and in another area or in the full area of the image plane; and exposure control means for controlling an exposure according to a computed value obtained by weighting outputs of the exposure detecting means on the basis of the level in a specific component of video signals obtained from the light measuring area and the other area or the full area. The light measuring area is thus arranged to be shifted to a new position of the object when a change occurs in the position of the object within the image plane. In that event, a signal for exposure control is formed on the basis of information on a difference in a specific frequency component between the video signals obtained from the current light measuring area and the other area or from the light measuring area and the full area of the image plane including the light measuring area.

It is a further object of the invention to provide an exposure control device which always accurately controls exposures to light irrespectively of the position and the size of the object, a contrast between the object and the background and any other conditions.

Other objects and features of the invention will become apparent from the following detailed description of embodiments thereof taken in connection with the accompanying drawings.

BRIEF DESCRIPTION OF THE DRAWINGS

FIG. 16 is a block diagram showing a fifth embodiment of the invention wherein the arrangement of the light measuring area position control circuit is further changed.

DETAILED DESCRIPTION OF THE PREFERRED EMBODIMENTS

Figure 1:
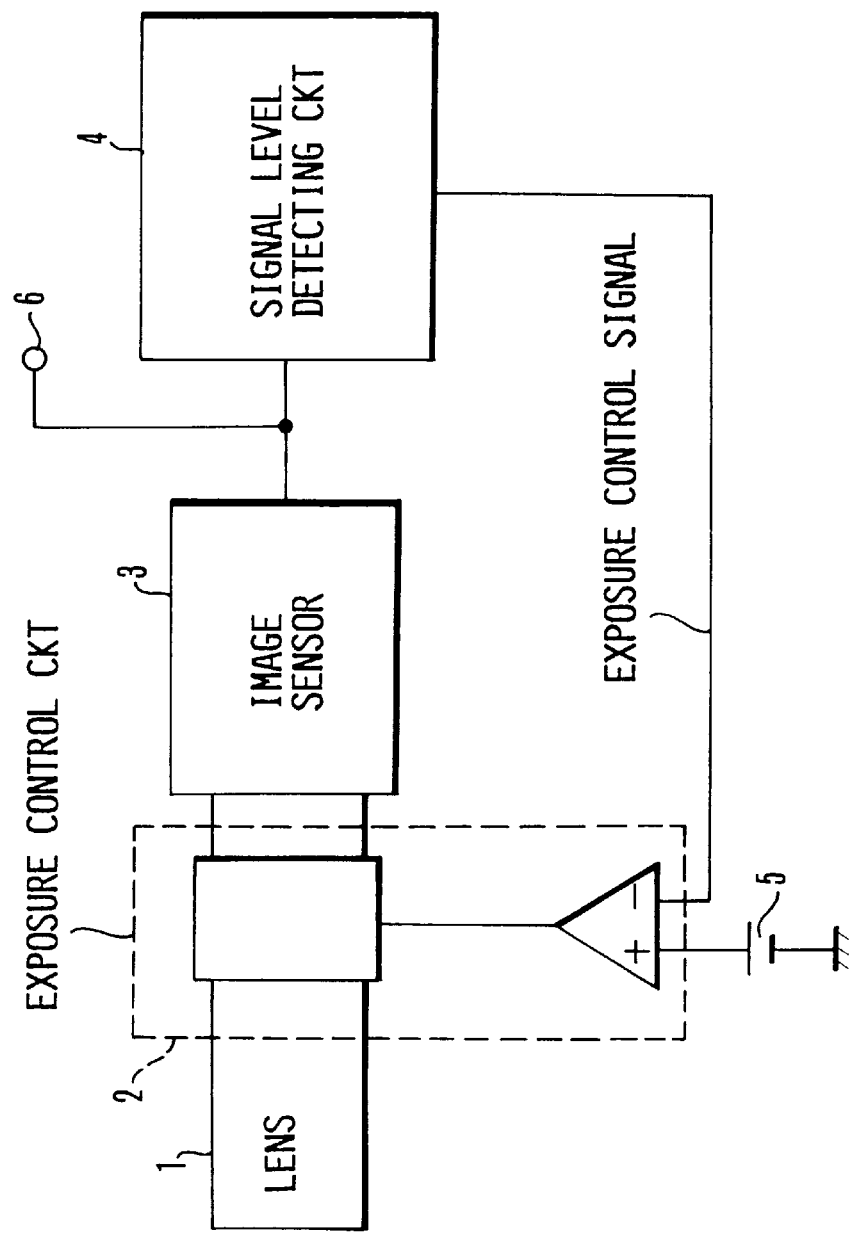
FIG. 1 is a block diagram showing by way of example the conventional exposure control device.
Figure 2:
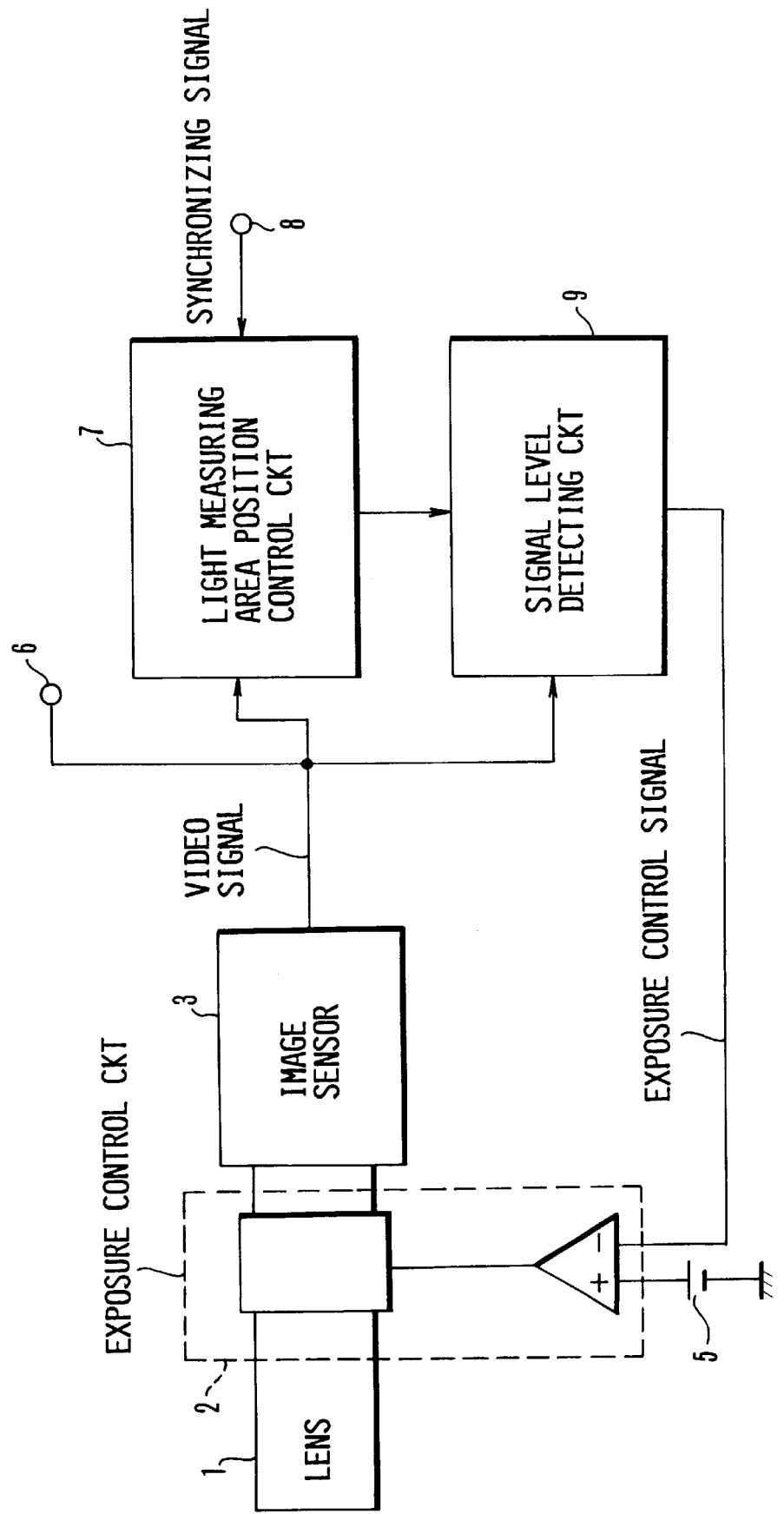
FIG. 2 is a block diagram showing an exposure control device arranged according to this invention as a first embodiment thereof.

The following description of embodiments shown in the drawings will show the details of the invention:

FIG. 2 is a block diagram showing a first embodiment of the invention. The component parts which are the same as those of FIG. 1 are indicated by the same reference numerals. The first embodiment of the invention differs from the conventional exposure control device of FIG. 1 in the following points: A light measuring area position control circuit 7 of the first embodiment is provided with a synchronizing (hereinafter referred to as sync for short) signal input terminal 8 for receiving horizontal and vertical sync signals. A signal level detecting circuit 9 of the embodiment is arranged to form an exposure control signal on the basis of a video signal obtained from a light measuring area which is designated on the image plane by the light measuring area position control circuit 7.

An object's image passed through a lens 1 comes to fall on an image sensor 3. The object's image is converted into a video signal. The video signal is supplied to the signal level detecting circuit 9 and also to the light measuring area position control circuit 7. The light measuring area position control circuit 7 controls the position of a light measuring area within the image sensing plane of the image sensor 3 in such a way as to cause the light measuring area to trace a change occurring in the position of the object's image, as will be described in detail later with reference to FIG. 3. The circuit 7 then supplies the signal level detecting circuit 9 with a light measuring area position signal which indicates the position of the light measuring area within the image (sensing) plane and is produced as an HV composite signal synchronized with the sync signals. The signal level detecting circuit 9 then forms the exposure control signal which is necessary for performing exposure control on the basis of the video signal coming from the image sensor 3 and the light measuring area position signal. More specifically, for example, an average value of the video signal obtained from the inside of the light measuring area designated within the image plane, or a value obtained by weighting and adding the video signal of the light measuring area to the video signal of the full image plane, is made to be the exposure control signal. This signal is supplied to an exposure control circuit 2. As mentioned in the foregoing, the exposure control circuit 2 is arranged to use the exposure control signal as a measure for an exposure and to control, for example, the aperture of a diaphragm in such a way as to make the signal coincide with the level value of a given level signal coming from a power source 5 arranged to generate the level signal which corresponds to a preset desired exposure control value.

Figure 3:
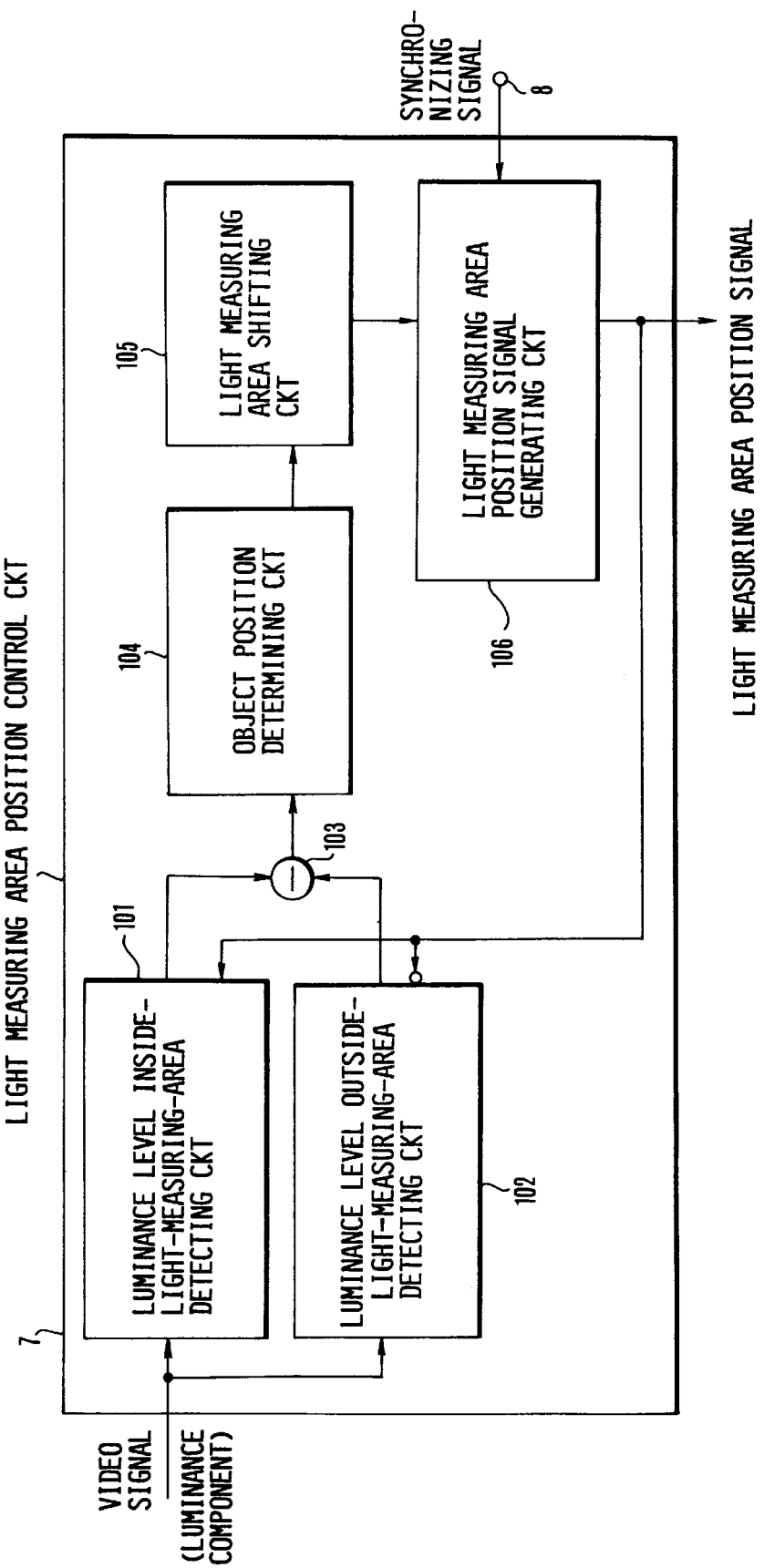
FIG. 3 is a block diagram showing the arrangement of a light measuring area position control circuit included in the block diagram of FIG. 2.

FIG. 3 shows by way of example the arrangement of the light measuring area position control circuit 7. The illustration includes a luminance level inside-light-measuring-area detecting circuit 101 which is arranged to detect a mean value of the level of luminance obtained within the light measuring area; a luminance level outside-light-measuring-area detecting circuit 102 which detects the level of luminance obtained in an outside area around the light measuring area; a subtraction circuit 103 which is arranged to compute and obtain a difference between the luminance level of the light measuring area and that of the outside area; an object position determining circuit 104 which is arranged to determine the current position of an object's image within the image plane on the basis of the luminance level difference between the inside and outside of the light measuring area; a light measuring area shifting circuit 105 which is arranged to shift the light measuring area to the object's position determined; and a light measuring area position signal generating circuit 106 arranged to generate a signal which indicates the current position of the light measuring area within the image plane and is produced in the form of an HV composite sync signal in synchronism with the sync signals. Further, the light measuring area position signal generating circuit 106 serves as a gate circuit. This gate circuit operates, on the basis of the HV composite sync signal, to allow to pass therethrough only a portion of the video signal which corresponds to the light measuring area on the image sensing plane and is included in the video signal produced from the image sensor 3.

Figure 4:
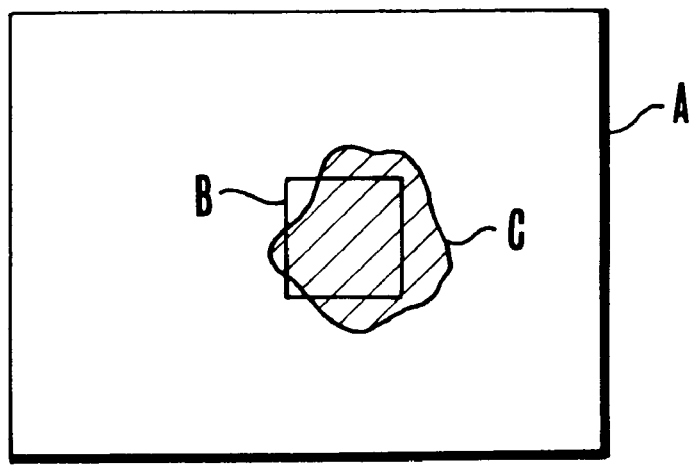
FIG. 4 is an illustration of a change occurring in the position of the image of an object within an image sensing plane and an action of causing a light measuring area to trace the change.
Figure 5:
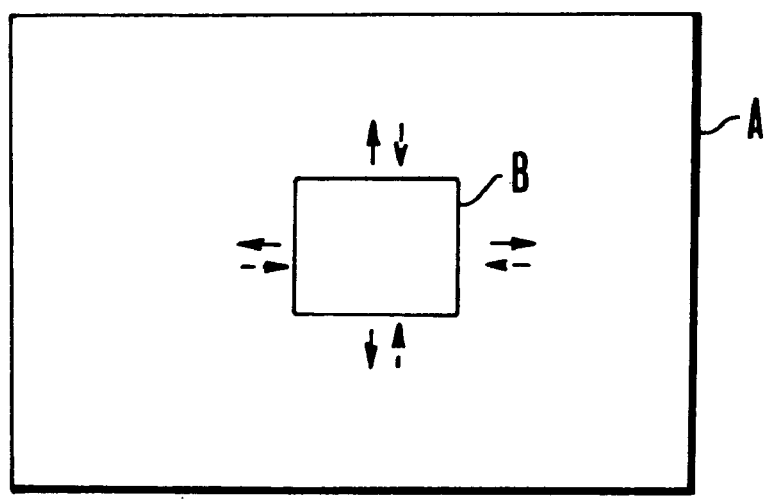
FIG. 5 is an illustration of the object-tracing algorithm of the light measuring area.

In FIG. 4, a reference symbol A denotes an image plane (or an image sensing plane); a symbol B a light measuring area; and a symbol C an object's image obtained within the image plane A. Referring to FIG. 4, the light measuring area position control circuit 7 of FIG. 3 operates as follows: When a video signal (or a luminance component of the video signal) is received, the luminance level inside-light-measuring-area detecting circuit 101 operates on the basis of the light measuring area position signal (a gate signal) to detect a luminance level obtained within the light measuring area B which is, for example, located in the middle part of the image plane A in the initial stage of operation). The luminance level outside-light-measuring-area detecting circuit 102 operates, on the basis of a gate signal which is obtained by inverting the light measuring area position signal, to detect a luminance level obtained in the outside area around the light measuring area B. The results of detection obtained by these circuits 101 and 102 are supplied to the subtraction circuit 103. The circuit 103 computes a difference between the results of detection. A difference signal thus obtained is supplied to the object position determining circuit 104. The circuit 104 temporarily retains the absolute value of the difference between the luminance levels obtained from the inside and outside of the light measuring area. Further, the position of the light measuring area B within the image plane A is serially shifted upward, downward, to the left and to the right as shown in FIG. 5 by a gate control action or the like performed through the light measuring area shifting circuit 105 and the light measuring area position signal generating circuit 106. With the light measuring area thus changed to the varied positions, the values of luminance difference between the inside and the outside of the light measuring area are computed at every one of these varied positions of the light measuring area. The object position determining circuit 104 determines one of these five positions at which the luminance difference is obtained in the largest value to be the position of the object C.

Figure 6:
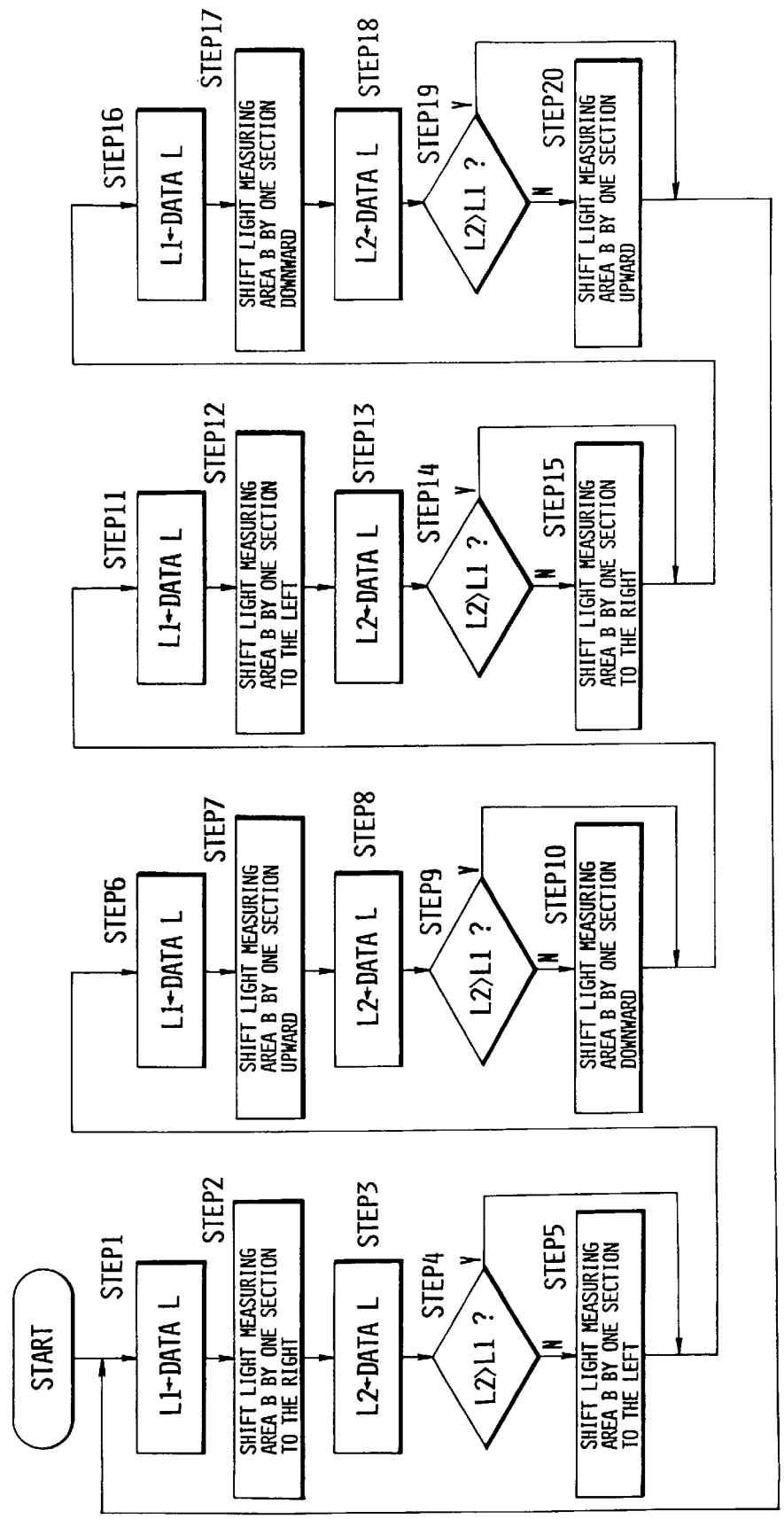
FIG. 6 is a flow chart showing the object-tracing algorithm of the light measuring area.

FIG. 6 shows in a flow chart the algorithm of the object position detecting operation. On the image sensing plane, the light measuring area B is shifted upward, downward, leftward and rightward from its middle position respectively to the extent of one section set at a predetermined distance. A difference between the average values of luminance levels obtained from the inside and outside of the light measuring area in these shifted positions thereof is obtained as mentioned above. The object (i.e. the object's image) is considered to have moved in the direction in which the largest absolute value is obtained among the average value differences between the luminance levels obtained from the inside and outside of the light measuring area in the shifted positions. This operation is described as follows with reference to the flow chart of FIG. 6: At a step 1, a luminance level difference signal data L indicative of the luminance level difference between the inside and the outside of the light measuring area is fetched from the subtraction circuit 103. This signal is assumed to be data L1. The data L1 is stored in a variable L. At a step 2: An instruction is given to the light measuring area shifting circuit 105 to shift the light measuring area B on the image sensing plane to the right to the extent of one section. At a step 3: Again the luminance level difference signal data L is fetched as data L2. At a step 4: The data L2 is compared with the data L1. If the data L2 is found to be larger than the data L1, the flow comes to a step 6. If the data L1 is found to be equal to or larger than the data L2, the flow proceeds to a step 5. At the step 5: The light measuring area B is shifted to the left by one section and then the flow comes to the step 6. At the step 6: Again the luminance level difference signal data L is fetched as the data L1. At a step 7: The light measuring area B is shifted upward by one section. At a step 8: The luminance level difference signal data L obtained at the new position of the area B is fetched as the data L2. At a step 9: The data L2 is compared with the data L1. If the data L2 is found to be larger than the data L1, the light measuring area B is left in the above stated position. If the data L1 is found to be equal to or larger than the data L2, the flow comes to a step 10. At the step 10: The area B is shifted downward by one section to bring it back to its previous position and then the flow comes to a step 11. The light measuring area B is shifted in the like manner to the left or right at steps 11 to 15 and downward or upward at steps 16 to 20. The light measuring area has the position thereof set in this manner. Therefore, with the steps 1 to 20 repeatedly executed, the light measuring area B is shifted to such a position that gives the largest value of luminance level difference between the inside and the outside of the light measuring area B. In other words, the luminance difference between the inside and the outside of the light measuring area (or a difference in luminance between a main object and a background) becomes the largest value if the main object to be photographed is located within the light measuring area. The embodiment is therefore capable of continuously adjusting the light measuring area B to the image of the main object. The above stated arrangement to wobble the light measuring area B upward, downward, to the left and to the right may be replaced with a different arrangement whereby an object tracing gate is additionally provided and the light measuring area B is set in the position of the gate.

The light measuring area B is thus shifted to the position of the object's image by means of the light measuring area shifting circuit 105 by the above stated flow of operation, which is executed for every field. This enables the light measuring area B to trace the movement of the object's image within the image plane A. Further, in the case of this embodiment, there is provided no tracing detection area which divides the image plane A into inner and outer parts for the purpose of determining the position of the object C. Instead of such an arrangement, the light measuring area B is arranged to be used also as such a detection area. The light measuring area position signal generating circuit 106 is arranged to provide the signal level detecting circuit 9 of FIG. 2 with a light measuring area position signal which indicates the position of the light measuring area B determined within the image plane A in the above stated manner.

Figure 7:
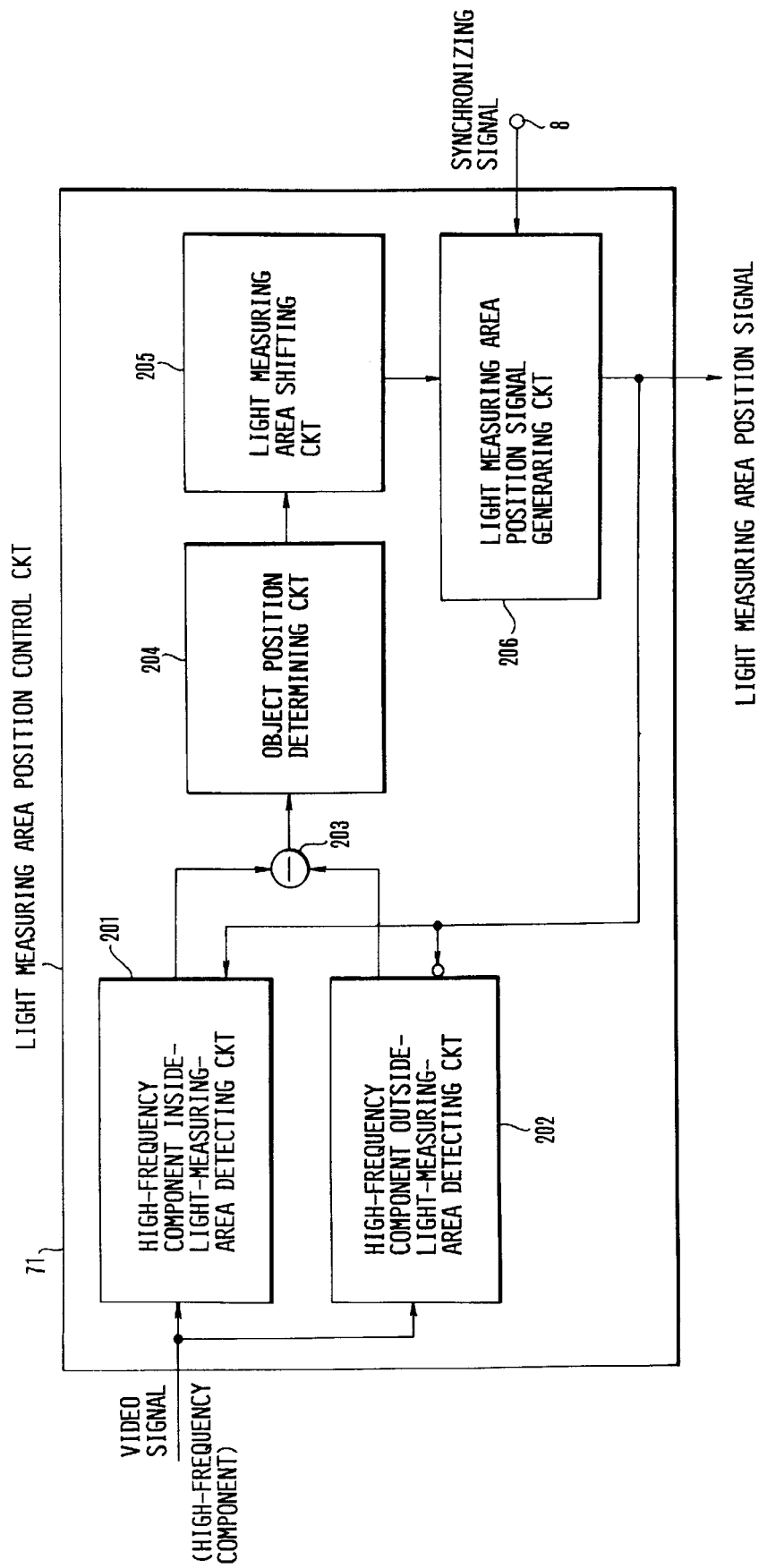
FIG. 7 is a block diagram showing an exposure control device arranged as a second embodiment of this invention, wherein the arrangement of the light measuring area position control circuit is changed.

FIG. 7 shows another example of arrangement of the light measuring area position control circuit 7 of FIG. 2. Referring to FIG. 7, a light measuring area position control circuit 71 includes a high-frequency component inside-light-measuring-area detecting circuit 201 which is arranged to detect a high-frequency component obtained within the light measuring area; a high-frequency component outside-light-measuring-area detecting circuit 202 which is arranged to detect the high-frequency component obtained within an area located around the light measuring area; a subtraction circuit 203 which is arranged to compute a difference between the high-frequency component levels obtained from the inside and outside of the light measuring area; an object position determining circuit 204 which is arranged to determine, on the basis of the high-frequency component difference between the inside and the outside of the light measuring area, the position of an object's image currently obtained within the image plane; a light measuring area shifting circuit 205 which is arranged to shift the light measuring area to the object's position determined by the circuit 204; and a light measuring area position signal generating circuit 206 which is arranged to generate a signal, as an HV composite signal synchronized with the sync signals, indicating the currently obtained position of the light measuring area within the image plane.

The high-frequency component of a video signal which is located on the high frequency side of a luminance signal component within the video signal is arranged to be supplied via a band-pass filter (not shown) to the light measuring area position control circuit 71. With the high-frequency component supplied, the high-frequency component inside-light-measuring-area detecting circuit 201 detects the high-frequency component obtained within the light measuring area B. The high-frequency component outside-light-measuring-area detecting circuit 202 detects the high-frequency component obtained within the outside area around the light measuring area. The results of detection made by these circuits 201 and 202 are supplied to the subtraction circuit 203. The circuit 203 computes a difference between the two inputs. A difference signal thus obtained is supplied to the object position determining circuit 204. The circuit 204 then temporarily retains information (an absolute value) on the high-frequency component difference between the inside and the outside of the light measuring area B. Meanwhile, through the light measuring area position signal generating circuit 206, the light measuring area shifting circuit 205 causes the position of the light measuring area B within the image plane A to be shifted upward, downward, to the left and to the right by gate control, etc. The results of computation of high-frequency component difference between the inside and the outside of the light measuring area B in these shifted positions are obtained. With five high-frequency component difference values thus obtained, one of the five different positions of the light measuring area B that gives the largest of the five difference values is determined to be the position of the object C. Then, the light measuring area shifting circuit 205 shifts the light measuring area B to the object's position thus determined. The light measuring area position signal generating circuit 206 then produces a light measuring area position signal indicating the position of the light measuring area B ultimately determined within the image plane A in the above stated manner. This signal is supplied to the signal level detecting circuit 9 of FIG. 2. The operation for this control is performed in the same manner as in the case of the flow chart of FIG. 6.

Figure 8:
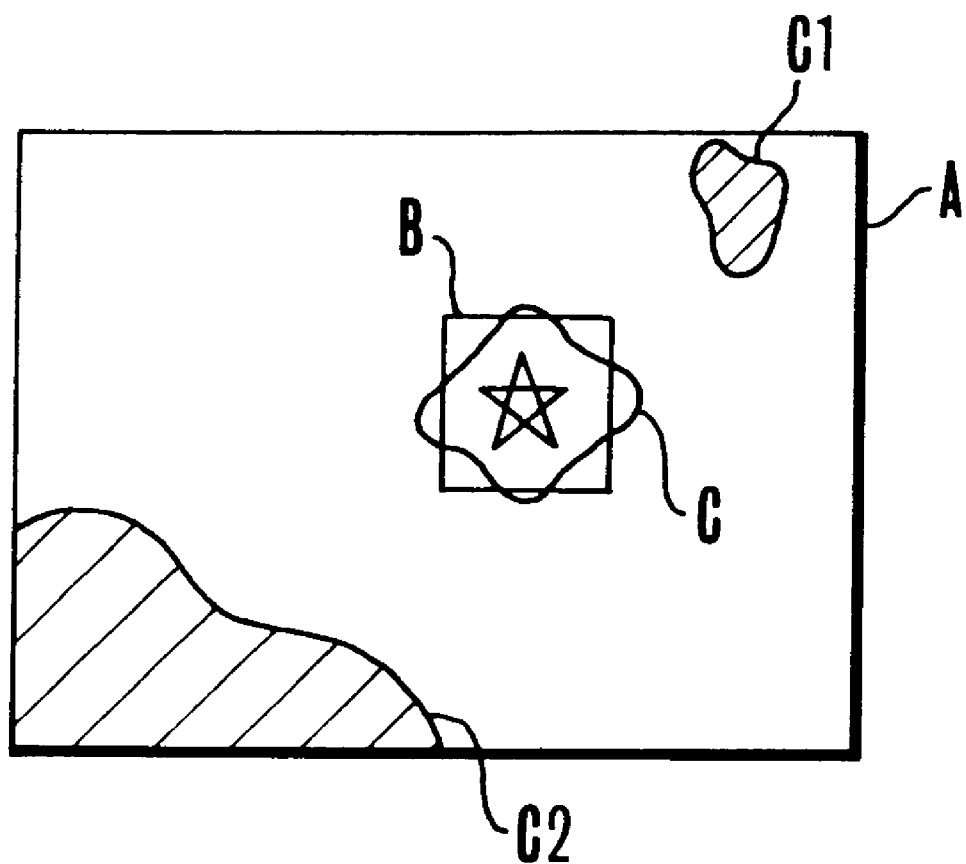
FIG. 8 is an illustration of an action of the second embodiment causing a light measuring area to trace a change occurred in the position of an object's image on an image plane.

This method for detecting the position of the object C on the basis of the high-frequency component is advantageous in cases where a distance between the video camera and the object to be photographed differs so much from a distance between the video camera and the background that the camera can be focused only on the object. FIG. 8 shows an example of operation performed in this method. In case that the object C is in focus on the image plan A, the high-frequency component is obtained in the largest value in that part of the image plane A. In this case, the position of the light measuring area B is shifted to the position of the object C. Another object C1 which is located farther than the object C is out of focus. The high-frequency component is obtained in a smaller value in the position of the object C1. An object C2 which is located at a near distance is also out of focus. The high-frequency component is, therefore, also obtained in a smaller value in the position of the object C2. The light measuring area B is therefore always adjusted to the position of the object C which is in focus and having the high-frequency component in a large value.

The embodiment is thus arranged to detect the position of the object C within the image plane A by a difference in luminance or high-frequency component between the inside and the outside of the light measuring area B and to cause the light measuring area B to trace the detected position of the object C. The arrangement enables the embodiment to always give optimum exposures for the object C. Even in cases where the object C is moving or where the camera is moved for panning or tilted, the embodiment gives a natural picture without having any unnatural change in exposure conditions.

As described above, the embodiment comprises computing means which computes information on a difference in a specific frequency component between video signals obtained from the inside and outside of a detection area which is shiftably set within an image plane; determining means for determining the position of an object within the image plane on the basis of the difference information which is computed by the computing means and obtained from each of different positions of the detection area on the image plane; and light measuring area setting means which is arranged to set a light measuring area at the object's position determined by the determining means and to have the position of the light measuring area always trace any changes taking place in the object's position on the image plane. The embodiment is, therefore, capable of always giving optimum exposures irrespectively of the position of the object within the image plane.

Figure 9:
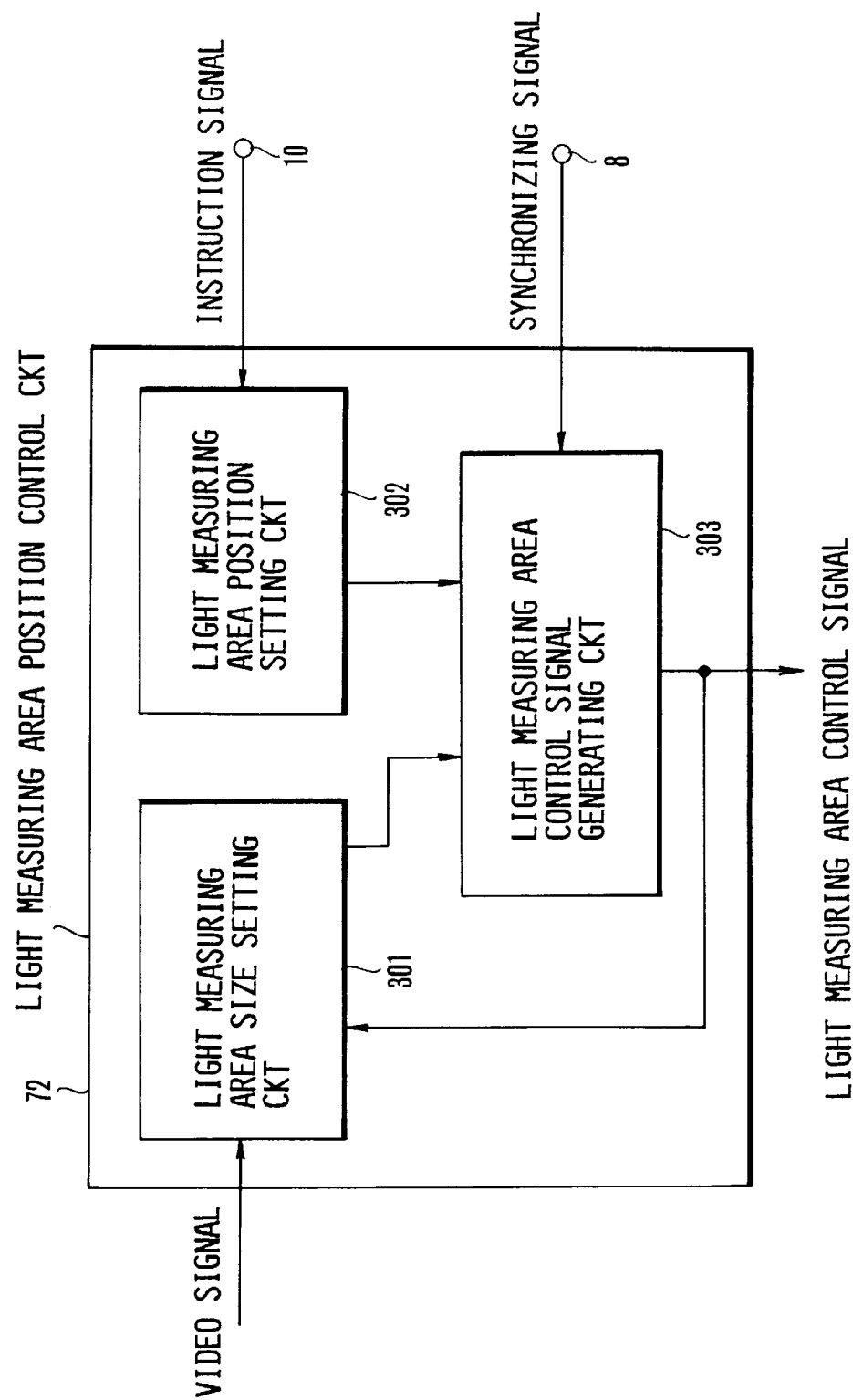
FIG. 9 is a block diagram showing a third embodiment of the invention wherein the light measuring area position control circuit of FIG. 2 is differently arranged.

FIG. 9 shows a third embodiment of the invention. In the case of the third embodiment, the light measuring area position control circuit 7 of FIG. 3 is replaced with a light measuring area position control circuit 72 which is arranged as shown in FIG. 9. With the exception of this component part, the rest of the third embodiment is arranged in the same manner as in the case of the FIG. 2. While the first and second embodiments are arranged to shift the light measuring area B to the position of the object (object's image) by detecting the object's position on the image plane, this embodiment is arranged to detect the size of the object's image and to vary the size of the light measuring area accordingly.

Referring to FIG. 9, an object's image which has passed through a lens 1 comes to fall upon the image sensor 3. The incident image is converted into a video signal. The video signal is supplied to the light measuring area position control circuit 72 as well as to the signal level detecting circuit 9. The circuit 72 allows the light measuring area to trace the object's position obtained within the image plane; sets the light measuring area in a size corresponding to that of the object's image as will be described in detail later with reference to FIGS. 9 and 10; and supplies the signal level detecting circuit 9 with a light measuring area control signal which is produced as an HV composite signal synchronized with sync signals and indicates the position and size of the light measuring area within the image plane. -The signal level detecting circuit 9 then forms an exposure control signal for exposure control on the basis of the video signal received from the image sensor 3 and the light measuring area control signal. More specifically, the exposure control signal is obtained, for example, from the average value of the video signal obtained from the inside of the light measuring area or by weighting the video signal of the full image plane with the video signal of the inside of the light measuring area. (In the latter case, the area other than the light measuring area is used as an auxiliary light measuring area). The exposure control signal thus obtained is supplied to the exposure control circuit 2. As mentioned in the foregoing, the exposure control circuit 2 uses the exposure control signal as a measure for exposure control. The exposure control is accomplished, for example, by controlling a diaphragm aperture in su.h a way as to make the exposure control signal coincide with a signal of a given level coming from the power source 5 which is arranged to generate the signal always at a level corresponding to a desired exposure control value.

Figure 10:
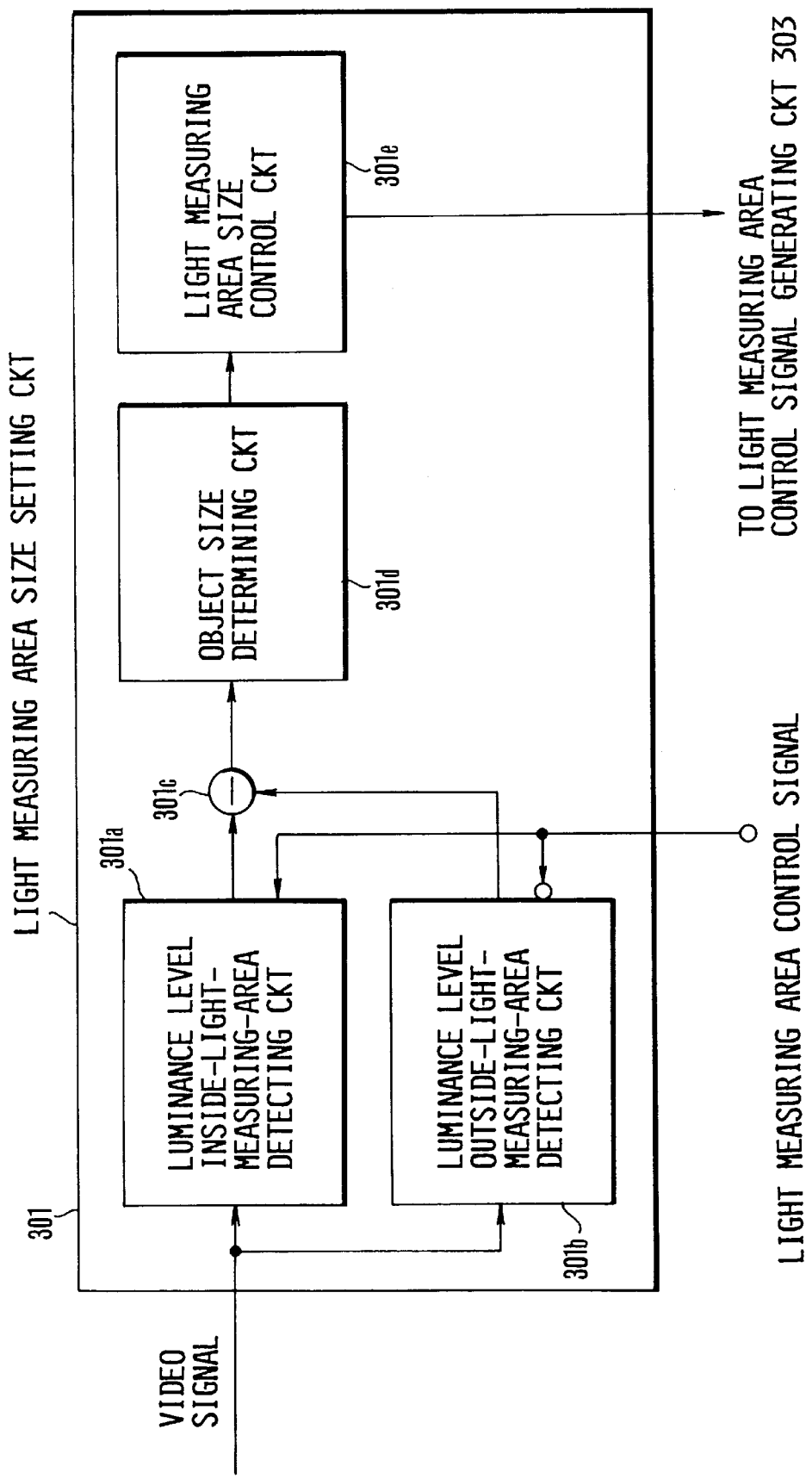
FIG. 10 is a block diagram showing the arrangement of a light measuring area size setting circuit of FIG. 9.

Referring to FIG. 9 which shows by way of example the arrangement of the above stated light measuring area position control circuit 72, the circuit 72 includes a light measuring area size setting circuit 301 which is arranged as shown in FIG. 10. Referring to FIG. 10, the circuit 301 includes a luminance level inside-light-measuring-area detecting circuit 301a; a luminance level outside-light-measuring-area detecting circuit 301b; a subtraction circuit 301c which is arranged to compute a difference in luminance level between the inside and the outside of the light measuring area; an object size determining circuit 301d which is arranged to determine the currently obtained size of an object's image from a plurality of absolute values of luminance difference information received from the subtraction circuit 301c; and a light measuring area size control circuit 301e which is arranged to cause the light measuring area to be in a size about equal to the size of the object's image. A light measuring area position setting circuit 302 is arranged to set the position of the light measuring area within the image plane at a part corresponding to the object's position in accordance with an instruction signal supplied either from a microcomputer provided for control from outside or by the photographer. A light measuring area control signal generating circuit 303 is arranged to generate, as an HV composite signal synchronized with sync signals, a signal indicating the position and the size of the light measuring area set within the image plane.

Figure 11:
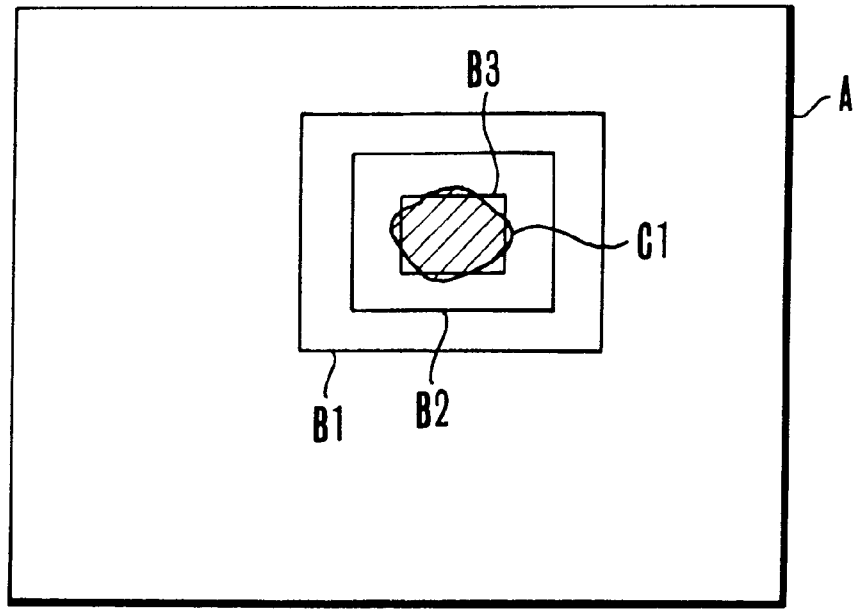
FIGS. 11 and 12 are illustrations of control over the size of the object's image and that of the light measuring area.
Figure 12:
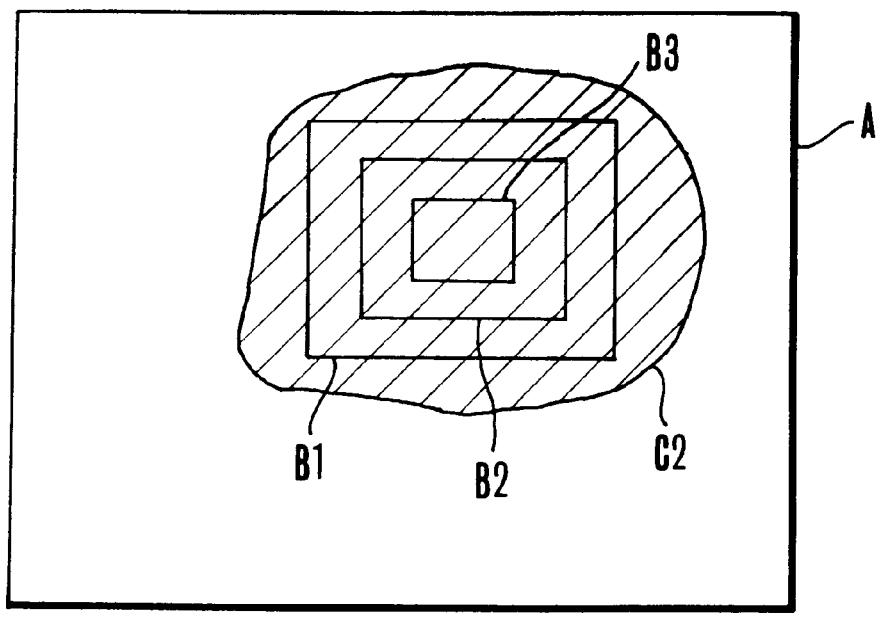

Next, referring to FIGS. 11 and 12, the operation of the circuit arrangement shown in FIGS. 9 and 10 is described as follows: A reference symbol A denotes the image plane. A symbol B (including B1 to B3) denotes the light measuring area the size of which varies-with the size of the object's image. A symbol C (including C1 and C2) denotes the object's image appearing on the image plane A. Upon receipt of a video signal, the luminance level inside-light-measuring-area detecting circuit 301a detects the level of luminance obtained within the light measuring area B, which is set, for example, in the middle part of the image plane A and at the area size B2 in the initial stage of the operation. Meanwhile, the luminance level outside-light-measuring-area detecting circuit 301b detects the level of luminance obtained in an area around the light measuring area B. The results of luminance level detection thus obtained by the circuits 301a and 301b are supplied to the subtraction circuit 301c. The circuit 301c obtains a difference between the luminance level inputs and supplies it to the object size determining circuit 301d. Then, the object size determining circuit 301d changes stepwise the size of the light measuring area B within the image plane A through a circuit which is not shown. In the case of FIGS. 11 and 12, the size of the light measuring area B is arranged, for example, to be changed in three steps. The luminance level difference between the inside and the outside of the light measuring area B is obtained at each of the stepwise varied sizes of the area B. One of the varied sizes at which the luminance level difference is obtained in a maximum value is regarded as about equal to the size of the object's image on the image plane. In other words, the size of the object C on the image plane A is determined in this manner. With the light measuring area B thus adjusted to an object to be photographed, the inside of the light measuring area B represents the object and the outside of the area the background. Therefore, the object is best covered by the light measuring area B when the luminance difference between the inside and the outside of the light measuring area B becomes a maximum value. Further, in this specific embodiment, the light measuring area B is arranged to serve also as a detecting area which is to be used for determining the size of the object C. However this arrangement may be changed to have an area discretely provided for the purpose of detecting the size of the object's image. The light measuring area size control circuit 301e sets the size of the current light measuring area B on the basis of the size of the object determined by the object size determining circuit 301d. Since the detecting area required for determining the size of the object C is arranged to be used in common with the light measuring area as mentioned in the foregoing, a light measuring area which gives the maximum luminance difference between the inside and the outside of the area is set as the current light measuring area B.

Figure 13:
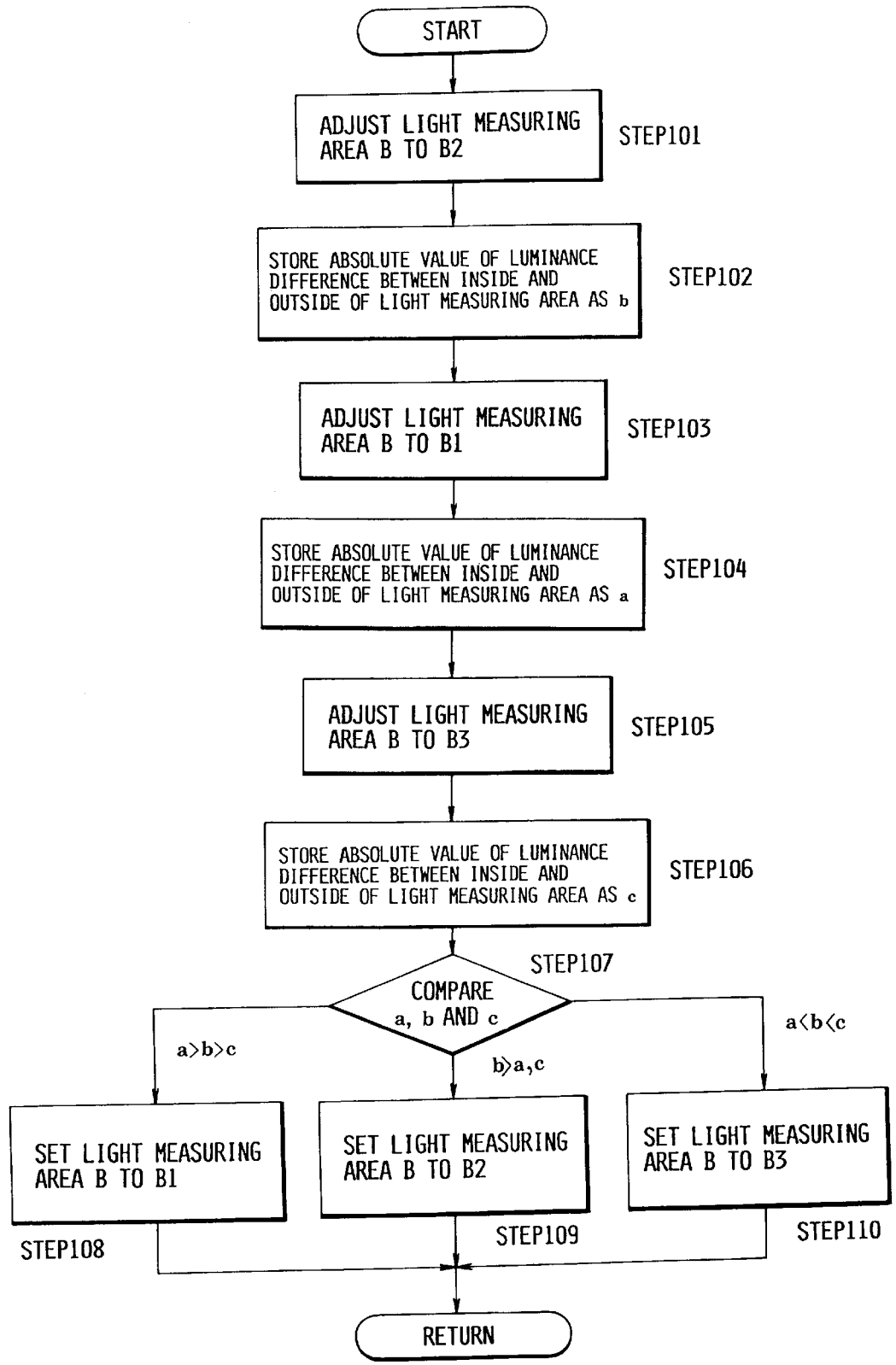
FIG. 13 is a flow chart showing a control action performed on the size of the light measuring area in accordance with the size of the object's image.

For example, in FIGS. 11 and 12, the object C is assumed to have uniform luminance and to be in strong contrast with the background. Referring to FIG. 13 which is a flow chart showing a routine for setting the size of the light measuring area, the different light measuring areas B1, B2 and B3 are set as the current light measuring area B one after another at steps 101 to 106. Then, the absolute values of luminance difference between the inside and the outside of these different light measuring areas are stored as data a, b and c. At a step 107: The data a, b and c are computed and compared with each other. The result of comparison becomes c>b>a when the image plane A is in a state as shown in FIG. 11, that is, when the size of the object C1 is about the same as or smaller than the light measuring area B3. In this case, the flow comes to a step 110 to set the light measuring area B at the area size B3. The result of comparison becomes c<b<a when the image plane A is in a state as shown in FIG. 12, that is, when the size of the object C1 is either larger than or about equal to the light measuring area B1. In that case, the flow comes to a step 108 to set the light measuring area B at the size of the area B1. If the size of the object C is about the same as that of the light measuring area B2, the result of comparison becomes b>a, c. Then, the flow comes to a step 109 to set the light measuring area B at the size of the area B2. In other words, with the size of the light measuring area B varied in the above stated manner, the value of the luminance difference between the inside and the outside of the light measuring area B becomes a maximum value in case that the size of the object C comes to approximately coincide with that of the light measuring area B and is at a smaller value in other cases.

The light measuring area size setting circuit 301 is arranged to cause the size of the light measuring area B to change step by step (in three steps in the case of this embodiment). The circuit 301 then checks each of the different sizes of the area for the luminance level difference between the inside and the outside of the area and sets the light measuring area B at a size that gives a maximum value of the difference. (This action is carried out, for example, for every field.) This causes the size of the light measuring area B to become about the same as that of the object C. (The light measuring area B becomes the size of the area B3 when the object's image is as shown in FIG. 11 and the size of the area B1 when the object's image is as shown in FIG. 12.) In addition to the signal indicating the size of the light measuring area B which is determined in the manner as mentioned above, the light measuring area control signal generating circuit 303 receives from the light measuring area position setting circuit 302 also a signal indicating the position of the light measuring area B within the image plane A. On the basis of these input signals, the circuit 303 forms a signal indicative of the position and size of the light measuring area B within the image plane A.

The position and the size of the light measuring area B is thus determined to be corresponding to the position and size of the image of the object C obtained within the image plane A. Then, the signal level detecting circuit 9 produces an exposure control signal indicating either the average value of the video signal obtained from the inside of the light measuring area B or a value which is obtained by weighting the video signal of the full image plane by adding thereto the video signal of the light measuring area B. The exposure control circuit 2 uses the exposure control signal as a measure for an exposure and controls, for example, the diaphragm aperture in such a way as to cause the exposure control signal to become the same as the given level value of a signal generated by the power source 5. This action is performed in real time. Therefore, exposure control can be accomplished in the optimum manner for the object C.

Figure 14:
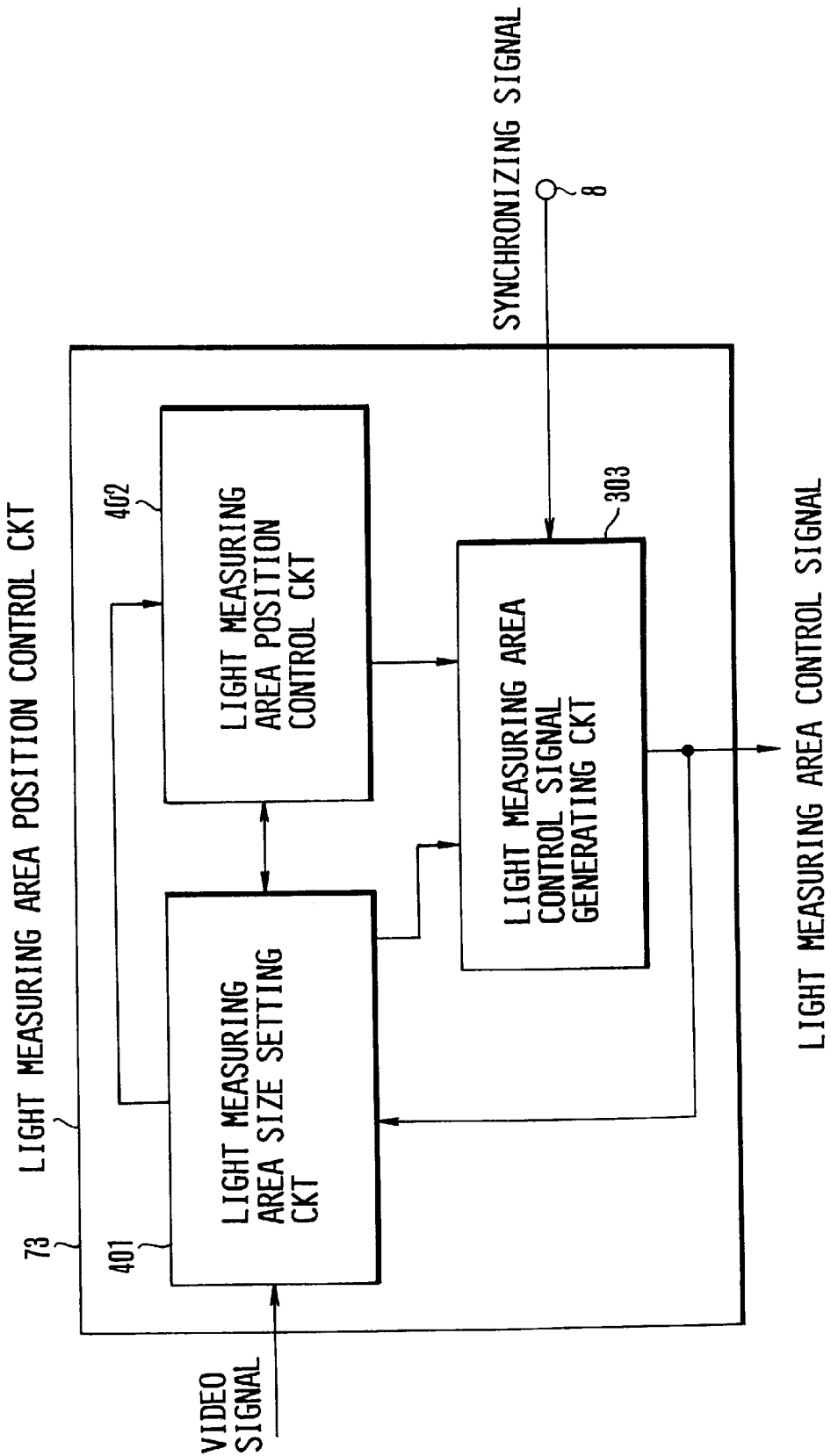
FIG. 14 is a block diagram showing the fourth embodiment of the invention wherein the arrangement of the light measuring area position control circuit is further changed.
Figure 15:
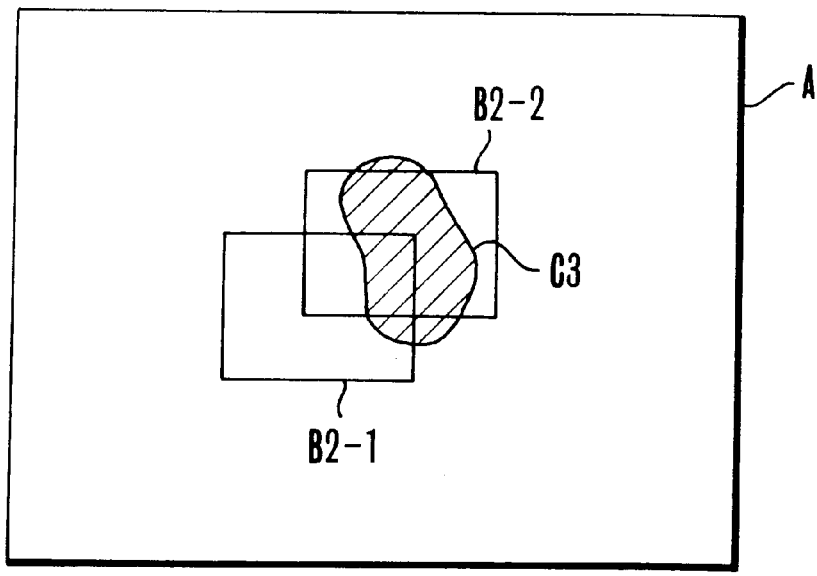
FIG. 15 is an illustration of the movement of the object's image and that of the light measuring area obtained by the arrangement of FIG. 14.

FIG. 14 shows by way of example a modification of the arrangement of the light measuring area position control circuit shown in FIG. 9. In the case of the light measuring area position control circuit 72 of FIG. 9, the position of the light measuring area B within the image plane A is arranged to be controlled in accordance with a signal applied from outside. Whereas, the light measuring area position control circuit 73 of FIG. 14 is arranged as follows: A light measuring area position control circuit 402 takes out, via a light measuring area size setting circuit 401 which is arranged in about the same manner as the light measuring size setting-circuit 301 mentioned in the foregoing, the information on the luminance difference between the inside and the outside of the light measuring area B the position of which is arranged to be variable within the image plane A. The light measuring area B is shifted to a position in which the difference information is obtained in a maximum value, that is, the area B is shifted to the object position C within the image plane A. This action is as described below with reference to FIG. 15:

Assuming that the luminance difference values between the inside and outside of light measuring areas B2-1 and B2-2 are expressed as ΔL1 and ΔL2, there obtains a relation of ΔL1 >ΔL2. The light measuring area position control circuit 402 is arranged to always make a check for the luminance level obtained in the neighborhood of the object's image C3. The light measuring area is shifted to a position where the difference AL becomes of a maximum value. After that, this action is repeated, so that the position of the light measuring area B2 can be kept in a position coinciding with the position of the object's image C within the image plane A. The control over the position of the light measuring area B and the control over the size of the light measuring area B may be performed either in parallel to each other or, in the case of using one and the same microcomputer in making judgment, by forming a sequential algorithm. The light measuring area control signal generating circuit 303 generates a signal indicating the position and the size of the light measuring area B within the image plane A on the basis of signals produced from the light measuring area size setting circuit 401 and the light measuring area position control circuit 402 in the same manner as described in the foregoing.

More specific description of the above stated operation is as follows: In accordance with the light measuring area position setting control procedures of FIG. 5 described in the foregoing, the light measuring area position setting circuit 302 causes the light measuring area B to trace the position of the object's image. After completion of the step 20, for example, the size of the light measuring area is set by jumping to the light measuring area size setting routine of FIG. 13. This method will be described in detail in the description of embodiments shown in FIG. 19 and ensuing drawings.

Figure 17:
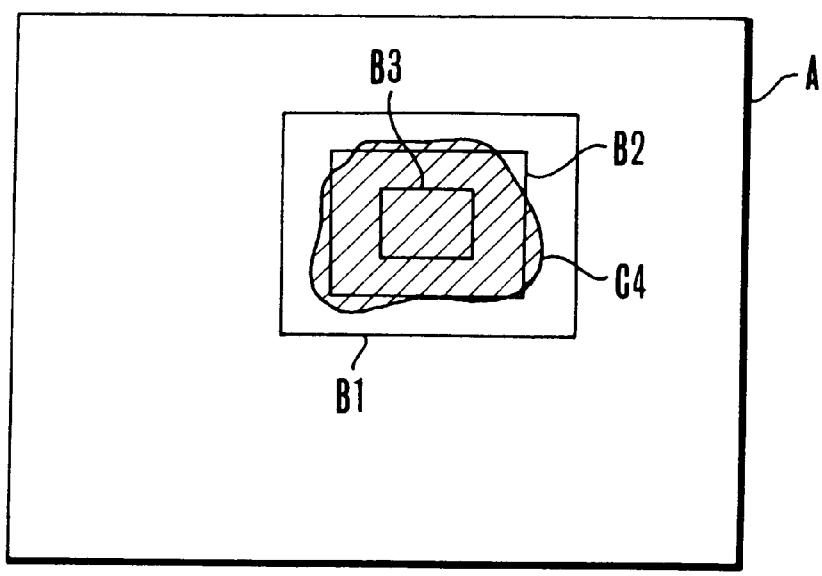
FIG. 17 is an illustration of a relation between an object's image and a light measuring area obtained on an image plane.

FIG. 16 shows by way of example another different arrangement of the light measuring area position control circuit 7. In this case, the inside of the image plane A is arranged to have any of three light measuring areas including a large area B1, a medium area B2 and a small area B3 as shown in FIG. 17. A luminance difference between the inside and the outside of each of these areas is monitored and one area having the largest value of the luminance difference among these light measuring areas is selected. In the case of FIG. 16, a light measuring area control signal generating circuit 502 which corresponds to the circuit 303 of FIG. 9 is arranged to generate signals indicating three different sizes corresponding to the light measuring areas B1, B2 and B3 of FIG. 17. A light measuring area size setting circuit 501 then monitors the luminance difference between the inside and the outside of each of the areas B1 to B3. A selection switch 503 selects the area which is closest in size to an object's image C4 among the large, medium and small light measuring areas B1 to B3 and produces a light measuring area control signal corresponding to the selected area (the light measuring area B2 in the case of FIG. 17).

Figure 18:
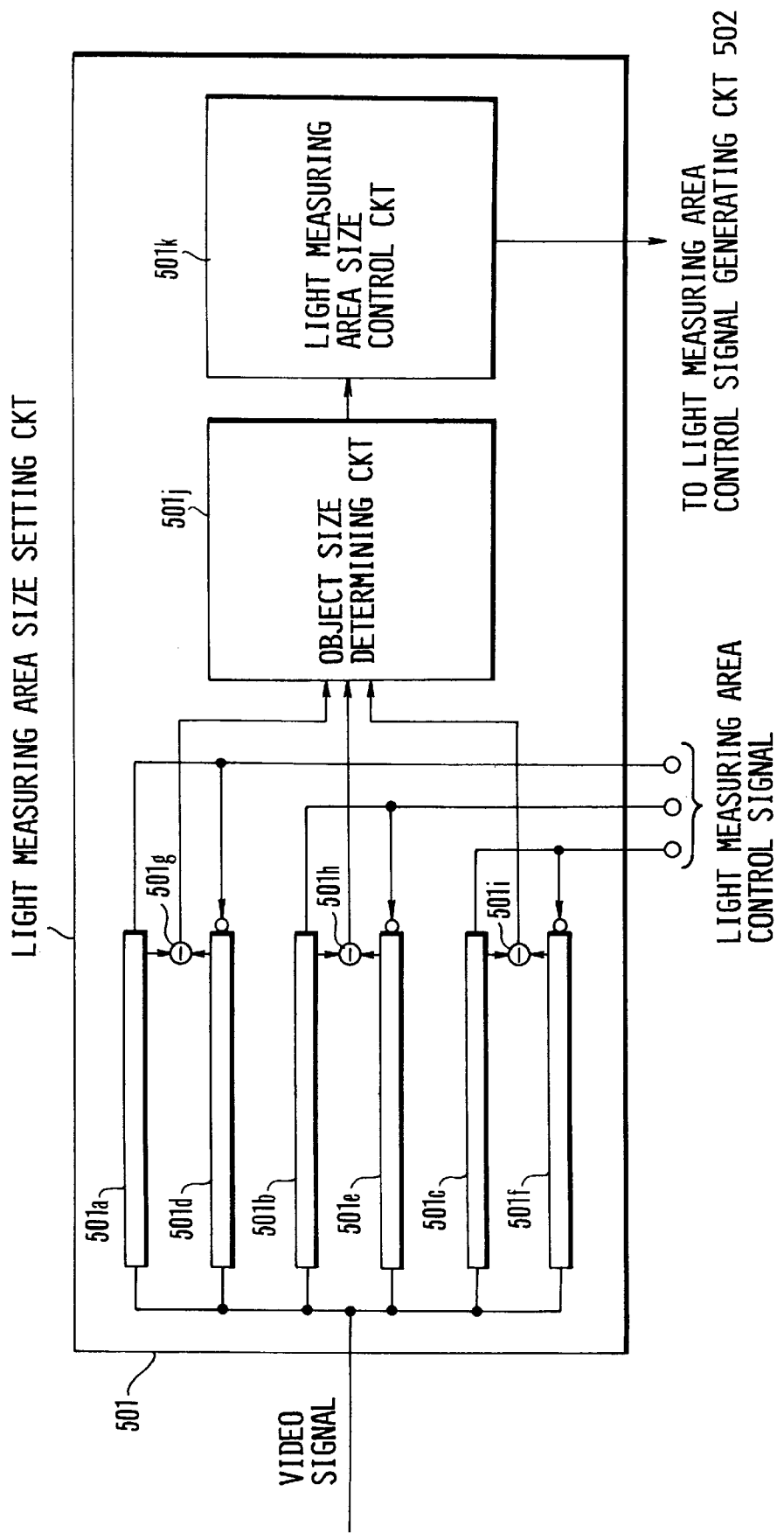
FIG. 18 is a block diagram showing the details of a light measuring area size setting circuit which is included in FIG. 16.

The details of the above stated light measuring area size setting circuit 501 is as shown in FIG. 18. Referring to FIG. 18, the circuit 501 includes luminance level inside-light-measuring-area detectors 501a to 501c which are arranged similarly to the luminance level inside-light-measuring-area detecting circuit 301a of FIG. 10 to detect luminance levels obtained from the inside of the light measuring areas; luminance level outside-light-measuring-area detectors 501d to 501f which are arranged similarly to the luminance level outside-light-measuring-area detecting circuit 301b of FIG. 10 to detect luminance levels obtained from the outside of the light measuring areas; subtracters 501g to 501i; object size determining circuits 501j which is arranged to receive the luminance level difference signals for the three different light measuring areas B1 to B3; and a light measuring area size control circuit 501k which is arranged to set the size of the currently employed light measuring area B.

With the light measuring area size setting circuit 501 arranged in the manner as described above, the light measuring area B corresponding to the size of the object's image C is selectable by means of a hardware arrangement from a relation among the values of luminance difference obtained between the inside and the outside of each of the three light measuring areas B1 to B3. This is further described with reference to FIGS. 11 and 12 as follows: The absolute values a, b and c of differences in average luminance between the inside and the outside of the light measuring areas are in a relation a<b<c under a condition which is as shown in FIG. 11 and are in a relation a>b>c under a condition which is as shown in FIG. 12. In case that the size of the light measuring area B2 approximately coincides with that of the object's image C4 as shown in FIG. 17, the absolute values are in a relation b>a, c. Therefore, the size of the light measuring area B can be decided from the luminance difference between the inside and the outside of the light measuring area as to whether it should be increased or decreased.

In the arrangement example described above, the size of the light measuring area B is kept under constant monitoring control. However, this arrangement may be changed, for example, as follows: When the size of the light measuring area B is decided once, the size may be locked and fixed to that size on the assumption that an adequate exposure is obtainable for the object C until the luminance level difference between the inside and the outside of the light measuring area B comes to change to a given degree. After that, when the luminance difference between the inside and the outside comes to change to a degree exceeding the given degree, the locked state is canceled to permit resumption of the size control over the light measuring area B.

This embodiment is arranged, as described above, to determine the size of the object C on the image plane A according to the absolute value of luminance difference between the inside and the outside of the light measuring area B and to adjust the size of the area B to that of the object C. This arrangement permits optimum exposures for the object C. Further, the embodiment is arranged to be capable of shifting the position of the light measuring area B to that of the object's image on the image plane A. The arrangement not only further enhances the possibility of the optimum exposure but also gives natural images even in the event of a panning or tilting operation on the camera. In the case of this embodiment, the size of the object's image is determined on the basis of a difference in luminance between the inside and the outside of the light measuring area B as mentioned above. The invention is, however, not limited to this arrangement. The arrangement may be changed to change the size of the light measuring area B stepwise; to detect, for each of the stepwise varied sizes, a difference between the video signals passing through the inside and the outside of the light measuring area B in respect to a high-frequency component located on the higher frequency side of the luminance component included in the video signal; and to set the size of the light measuring area B at one of the stepwise changed sizes according to the results of detection.

In accordance with the arrangement of the embodiment described, computation is performed to obtain a difference in a specific frequency component between the video signals obtained from the inside and outside of a detecting area the size of which is arranged to be variable; the size of the object's image on the image plane is determined from information on the computed difference obtained for each of the varied sizes of the detecting area; and the size of a light measuring area is adjusted to the size of the object's image determined. In other words, the size of the light measuring area is increased when the size of the object's image is large and decreased when the size of the object's image is smaller on the image plane. The embodiment is, therefore, capable of always giving optimum exposures even when the size of the object's image changes on the image plane.

Figure 19:
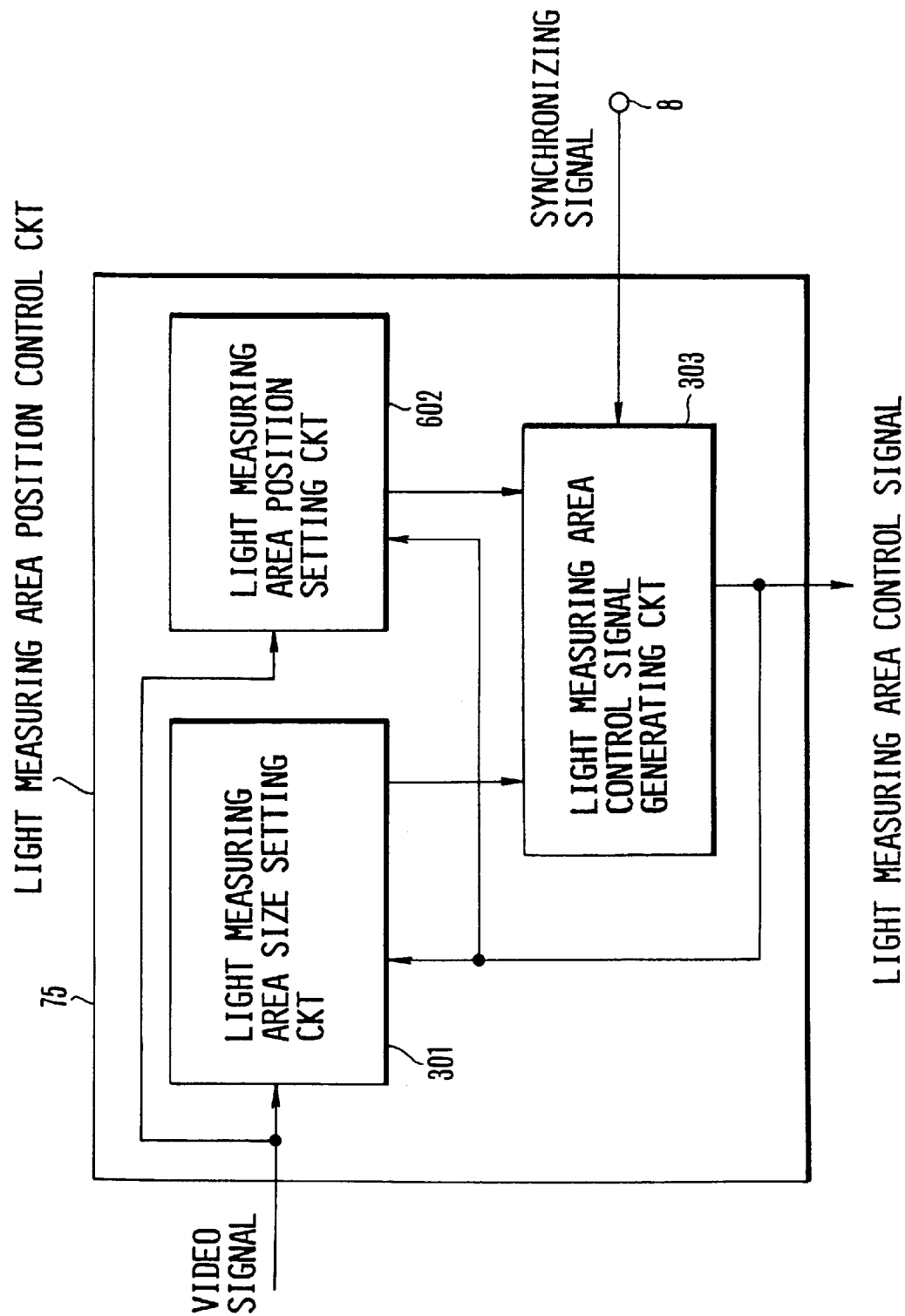
FIG. 19 is a block diagram showing a sixth embodiment of the invention wherein the light measuring area position control circuit of FIG. 2 is changed.

FIG. 19 shows another (or sixth) embodiment of this invention. The embodiment is provided with light measuring area control means which is arranged to control the position and the size of the light measuring area within the image plane according to the position and the size of the object's image like in the case of FIGS. 14 and 15. The position and the size of the light measuring area are thus adjusted to those of the object's image obtained on the image plane.

In the case of this embodiment, the light measuring area position control circuit 7 of FIG. 2 is replaced with a light measuring area position control circuit 75 of FIG. 19. With the exception of the arrangement of the light measuring area position control circuit 75, the embodiment is arranged in the same manner as in the arrangement shown in FIG. 2. Therefore, the same components parts as those of FIG. 2 are indicated by the same reference numerals of FIG. 2 and the details of them are omitted from description.

Referring to FIGS. 2 and 19, an object's image which has passed through the lens 1 comes to fall upon the image sensor 3. The image is converted into a video signal by the image sensor 1. The video signal is supplied to the light measuring area position control circuit 75 as well as to the signal level detecting circuit 9. The circuit 75 causes the light measuring area to change its position tracing the position of the object on the image plane and also set the light measuring area at a size corresponding to the size of the object's image, as will be described in detail later. The circuit 75 then produces a light measuring area control signal in the form of an HV composite signal, in synchronism with sync signals, indicating the position and the size of the light measuring area within the image plane. The light measuring area control signal is supplied to the signal level detecting circuit 9. Then, an exposure control signal required for exposure control is formed by the signal level detecting circuit 9 on the basis of the video signal received from the image sensor 3 and the light measuring area control signal from the circuit 75. More specifically, the exposure control signal is formed to represent either the average value of the video signal obtained from the inside of the light measuring area or a value obtained from the video signal of the full image plane and weighted by adding the video signal of the light measuring area to that of the full image plane. The exposure control signal is supplied to the exposure control circuit 2. The circuit 2, as mentioned in the foregoing, uses the exposure control signal as a measure for an exposure and controls, for example, the aperture of a diaphragm in such a way as to make the value of the exposure control signal coincide with a given level value of a signal coming from the power source 5 which is arranged to always generate the signal at a level corresponding to a desired exposure control value.

Figure 20:
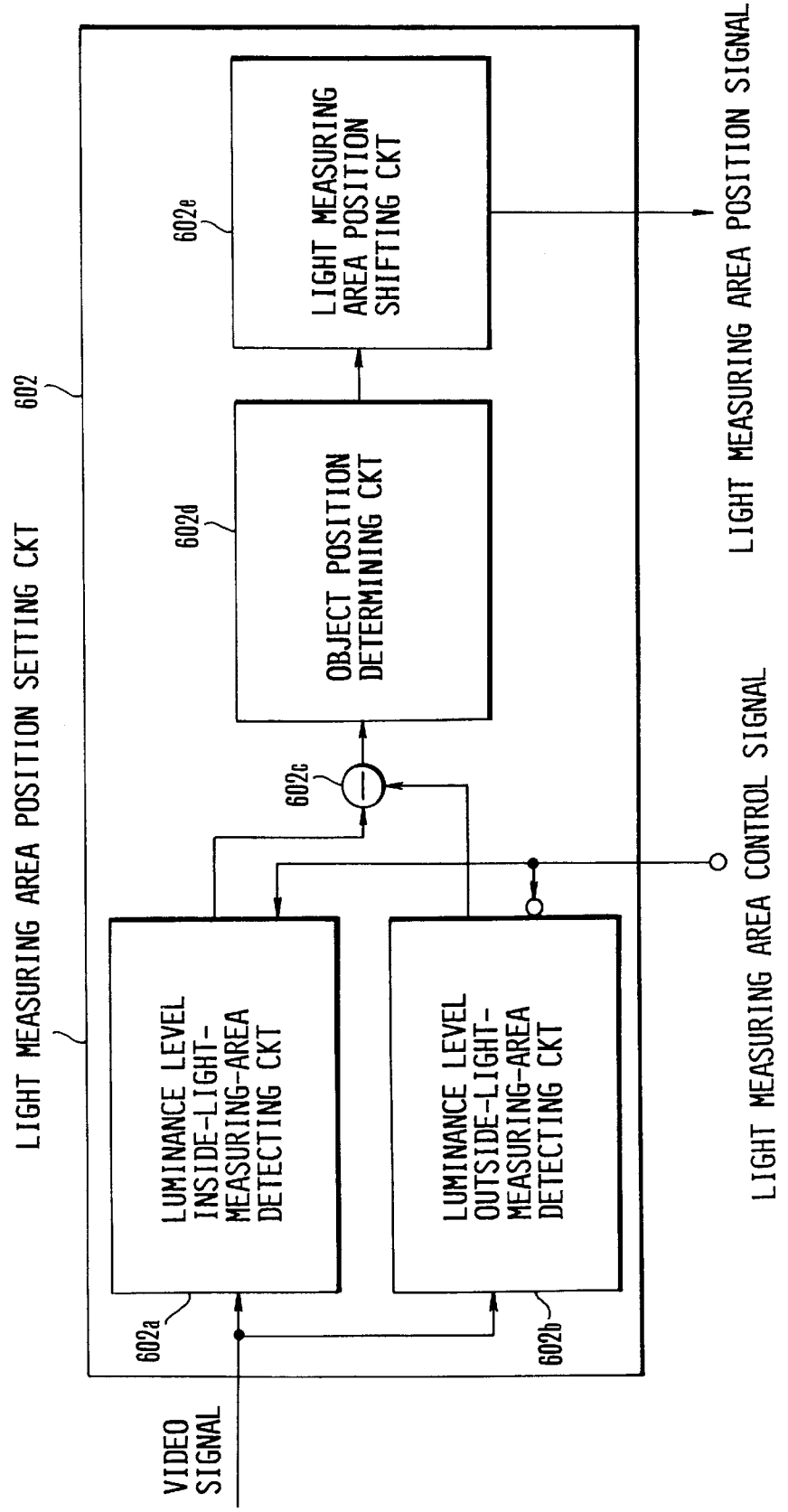
FIG. 20 is a block diagram showing the arrangement of a light measuring area position setting circuit which is included in FIG. 19.

FIG. 19 shows by way of example the arrangement of the light measuring area position control circuit 75. The circuit 75 includes a light measuring area size setting-circuit 301. The details of the circuit 301 are identical with the arrangement described in the foregoing with reference to FIG. 10 and, therefore, requires no further description. A light measuring area position setting circuit 602 shown in FIG. 19 is arranged as shown in FIG. 20. Referring to FIG. 20, the light measuring area position setting circuit 602 includes a luminance level inside-light-measuring-area detecting circuit 602a which is arranged to detect the luminance level obtained from the inside of the light measuring area; a luminance level outside-light-measuring-area detecting circuit 602b which is arranged to detect the luminance level obtained in the area located around the light measuring area; a subtraction circuit 602c which is arranged to compute a difference in luminance level between the inside and the outside of the light measuring area; an object position determining circuit 602d which is arranged to determine, on the basis of the above stated luminance level difference, the position of the object's image currently obtained within the image plane; and a light measuring area position shifting circuit 602e which is arranged to shift the light measuring area to the object's position determined by the circuit 602d. A light measuring area control signal generating circuit 303 is arranged to generate a signal which is an HV composite signal synchronized with sync signals and indicates the position and the size of the light measuring area on the image plane.

The operation of the light measuring area size setting circuit 301 has already been described in the foregoing with reference to FIGS. 11 and 12. In the circuit 301, the object size determining circuit 301d performs a gate control action or the like to change stepwise the size of the light measuring area B within the image plane A by performing gate control, etc. through the light measuring area control signal generating circuit 303. (The size of the light measuring area is arranged to be variable in three steps in the case of FIGS. 11 and 12.) The circuit 301d then considers one of the varied sizes of the light measuring area B which gives the largest value of luminance difference between the inside and the outside thereof among the varied sizes to be approximately coinciding with the size of the object's image on the image plane A. In other words, the size of the object's image C within the image plane A is thus determined by the object size determining circuit 301d.

The light measuring area size control circuit 301e sets the current size of the light measuring area B on the basis of the size of the object's image determined by the object size determining circuit 301d. More specifically, the size of the light measuring area B is set as follows: Assuming that the luminance of the object C is homogeneous having a strong degree of contract with the background and that the absolute values of the luminance difference between the inside and the outside of the light measuring area as obtained in the varied sizes of the area are a, b and c, the relation among these absolute values becomes c>b>a when the size of the object's image C1 is about equal to or less than that of the light measuring area B3. The relation becomes c <b <a when the former is larger than or about equal to the latter. The relation becomes b >a, c if the former is about equal to the latter. In other words, with the size of the light measuring area B varied, the difference in luminance between the inside and the outside of the area B comes to show a maximum value in case that the size of the object's image C approximately coincides with that of the light measuring area B. The difference value decreases in all other cases, that is, when the size of the object's image is either larger or smaller than the size of the light measuring area B. The light measuring area size setting circuit 101 is, therefore, arranged to change the size of the light measuring area to a small degree step by step; to check the luminance levels obtained inside and outside of the area at each of the changed sizes; and to set the light measuring area at the size that gives a maximum value of luminance level difference between the inside and the outside of the area. The size of the light measuring area B is thus made to coincide approximately with that of the object's image C.

Meanwhile the light measuring area position setting circuit 602 which is shown in detail in FIG. 20 is arranged as follows: The circuit 602 is assumed to operate-in parallel with the operation of the above stated light measuring size setting circuit 301 when the video signal (or the luminance component thereof) is received. Within the circuit 602, a luminance level inside-light-measuring-area detecting circuit 602a detects the luminance level obtained within the light measuring area B which has its size controlled in the above stated manner. A luminance level outside-light-measuring-area detecting circuit 602b detects the luminance level obtained around the light measuring area B. The results of luminance level detection are supplied to a subtraction circuit 602c. The circuit 602c obtains a difference between the luminance levels. The luminance level difference is supplied to an object position determining circuit 602d. The circuit 602d temporarily retains the input information on the luminance level difference between the inside and the outside of the area B and, at the same time, performs, through the light measuring area position signal generating circuit 303, a gate control action or the like to shift the position of the light measuring area B within the image plane A upward, downward, to the left and to the right. The circuit 602d then obtains the luminance difference between the inside and the outside of the area B for each of the shifted positions thereof. With a total of five luminance difference values thus obtained, the circuit 602d determines one of the five different positions of the area B to have the largest difference and to show the position of the object's image C within the image plane. A light measuring area position shifting circuit 602e then shifts the light measuring area B to the position of the object thus determined. This arrangement enables the light measuring area B to trace in real time the movement of the object C occurring within the image plane A.

Figure 23:
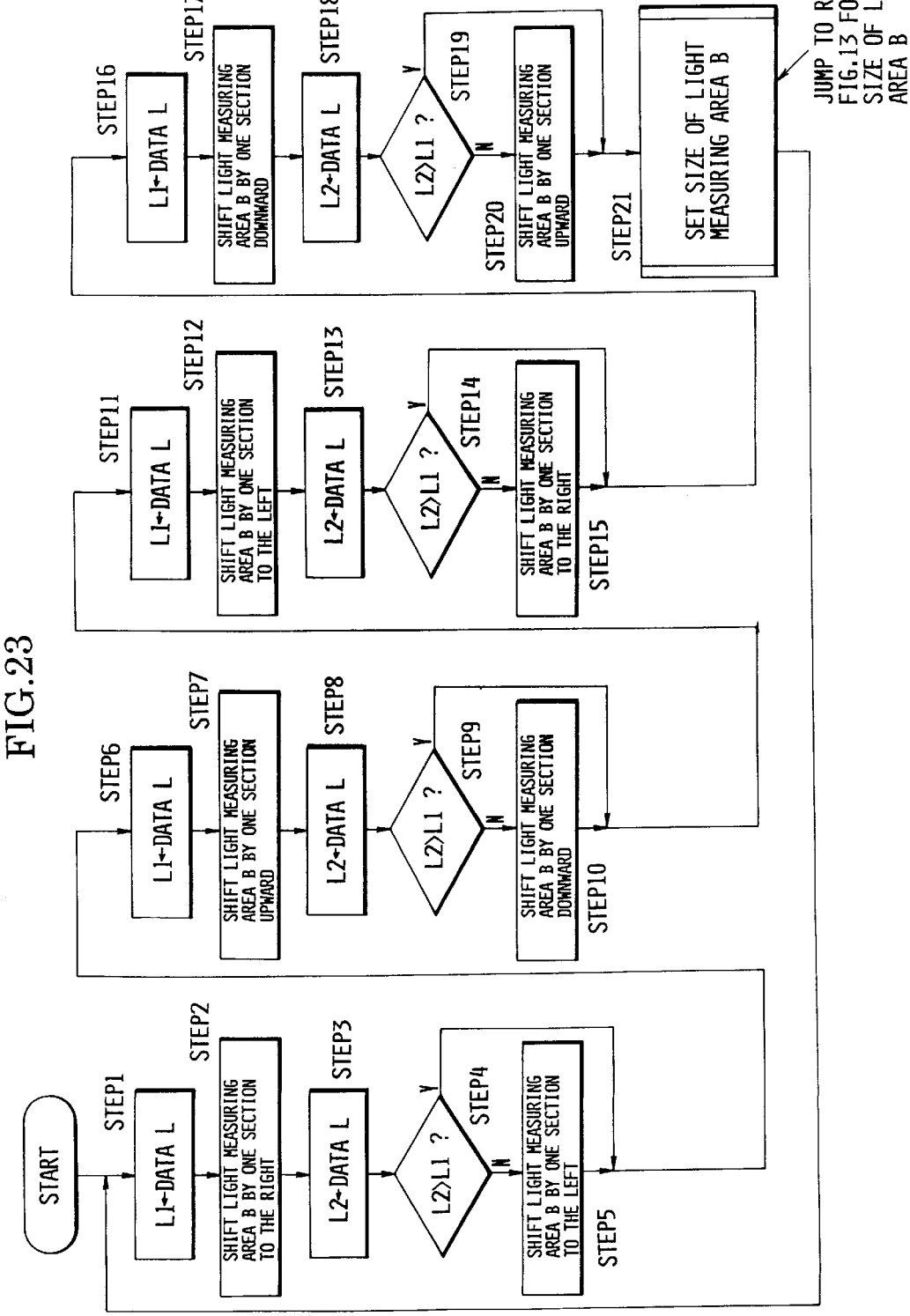
FIG. 23 is a flow chart showing the operation of the arrangement of FIG. 19 performed to set the light measuring area according to the shifting position and size of the image of an object.

FIG. 23 is a flow chart showing the control operation performed as described in the foregoing to change the size of the light measuring area according to the size of the object's image while tracing the movement of the object's image. The flow consists of an object tracing operation including steps 1 to 20 and a step 21 which is a routine for setting the size of the light measuring area B. The flow of steps 1 to 20 is identical with the operation shown in the flow chart of FIG. 6. The routine of the step 21 is identical with the light measuring area size setting routine which is shown in FIG. 13.

In other words, the flow of operation jumps to the light measuring area size setting routine of FIG. 13 after the light measuring area B is shifted (or wobbled) upward, downward, to the left and to the right to the given extent of one section at a time and is set in a position where the luminance difference between the inside and the outside of the light measuring area B becomes a maximum value. The routine of FIG. 13 is repeatedly executed to set the size of the area B in a cycle of one field. The operation at each of the steps is the same as in the case FIGS. 6 and 13 which have already been covered by the foregoing description and thus requires no further description.

To the light measuring area control signal generating circuit 303 are supplied the light measuring area size signal which indicates the size of the light measuring area B within the image plane A and is set in the above stated manner and the light measuring area position signal which indicates the position of the light measuring area B within the image plane A. In accordance with these input signals, the light measuring area control signal generating circuit 303 forms a light measuring area control signal indicating the position and the size of the light measuring area B within the image plane A.

The position and the size of the light measuring area B is determined according to the position and the size of the object's image within the image plane A in the manner as described in the foregoing. With the light measuring area B designated in this manner, the signal level detecting circuit 9 of FIG. 2 produces an exposure control signal. This signal represents, for example, either the average value of the video signal passing through the designated area B or a value of the video signal of the full image plane obtained by adding thereto the video signal obtained from the inside of the area B for weighting. Then, the exposure control circuit 2 uses this exposure control signal as a measure in determining an exposure. The circuit 2 controls, for example, the diaphragm aperture in such a way as to cause the exposure control signal to coincide with a signal of a given level signal coming from the power source 5 which is arranged to generate the signal always at a level corresponding to a desired exposure control value. This control action is executed in real time. The exposure, therefore, can be effected in the optimum manner for the object C.

Figure 21:
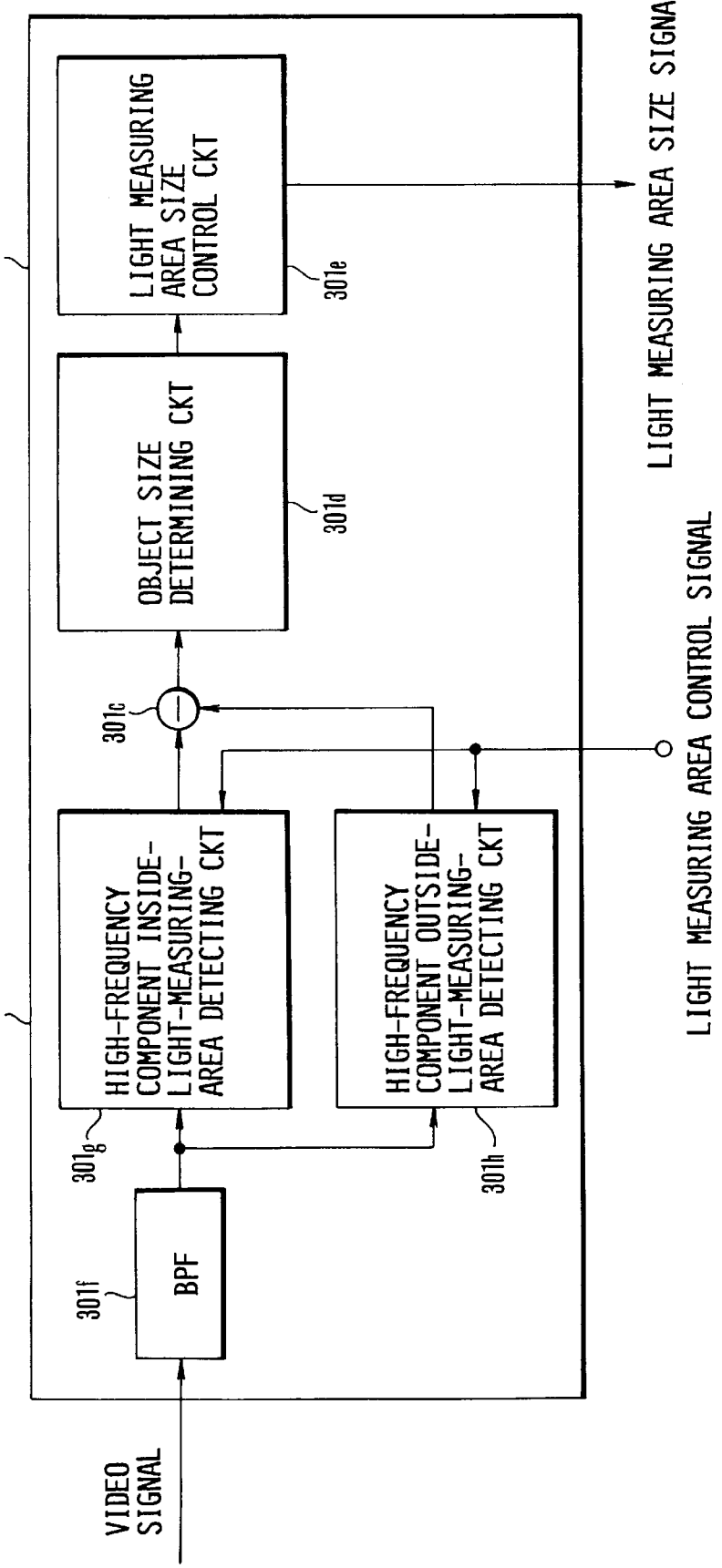
FIG. 21 is a block diagram showing a seventh embodiment of the invention wherein the arrangement of the light measuring area size setting circuit is changed.

FIG. 21 shows by way of example a modification of the light measuring area size setting circuit 301 of FIGS. 19 and 10. The light measuring area size setting circuit 301' of FIG. 21 differs from the circuit 301 of FIG. 10 in the following point: The high-frequency component which is on the high frequency side of the luminance component within the video signal is extracted by means of a band-pass filter 301f. The high-frequency component passing through the light measuring area B is then detected by a high-frequency component inside-light-measuring-area detecting circuit 301g. A high-frequency component outside-light-measuring-area detecting circuit 301h detects the high-frequency component passing through an area around the light measuring area B. The size of the object's image C is determined on the basis of information on a difference between the high-frequency component values detected by the circuits 301g and 301h.

More specifically, the size of the light measuring area B within the image plane A is changed stepwise by a plurality of steps by gate control or the like. One of the varied sizes of the light measuring area B that gives a maximum value of the high-frequency component difference between the inside and the outside of the area B among these sizes is determined to be approximately coinciding with the size of the object's image C currently obtained within the image plane A. The light measuring area B is then set at the size giving the maximum difference value.

Figure 22:
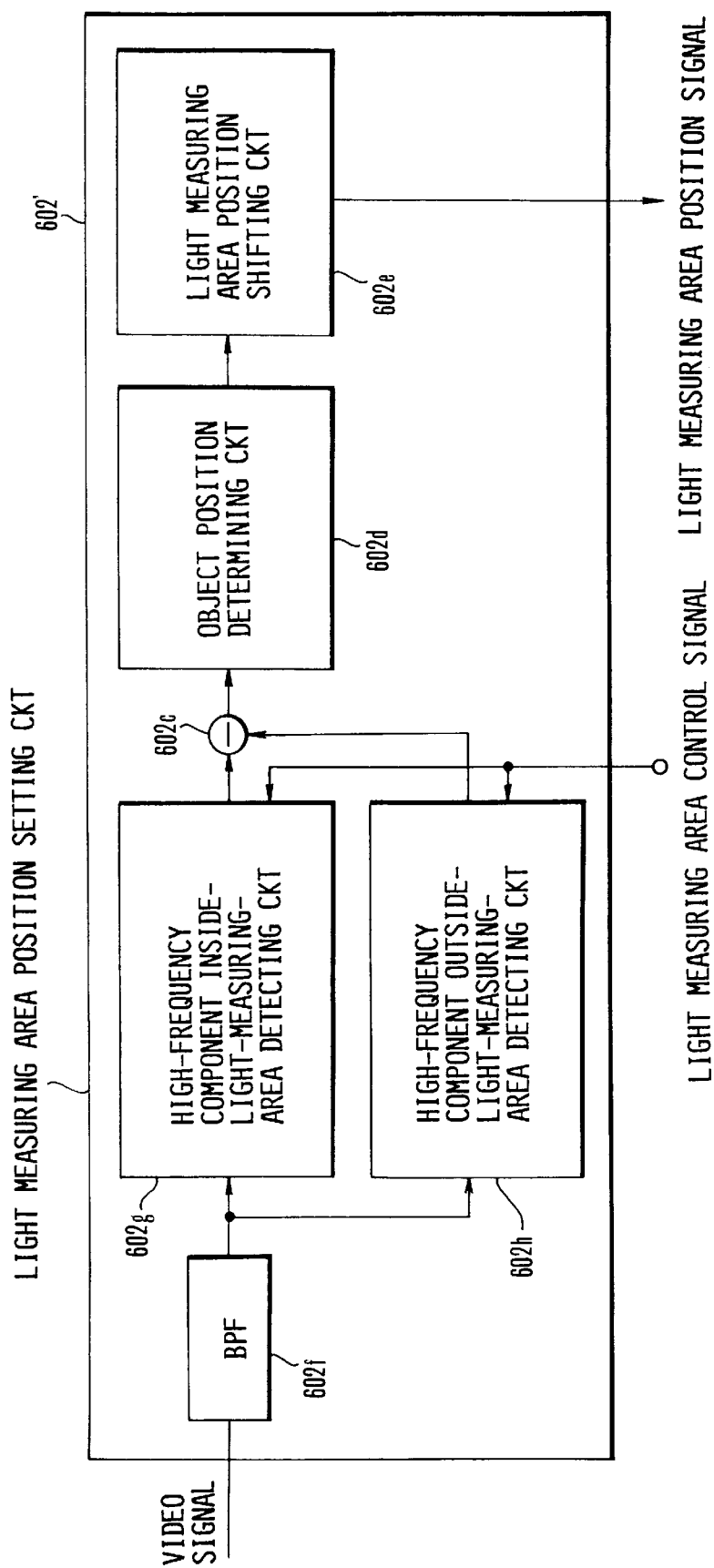
FIG. 22 is a block diagram showing an eighth embodiment of the invention wherein the arrangement of the light measuring area position setting circuit is changed.

FIG. 22 shows another example of the internal arrangement of the light measuring area position setting circuit 602. The circuit 602' of FIG. 22 differs from the circuit 602 of FIG. 20 in the following point: A high-frequency component which is located on the higher frequency side of the luminance component is taken out from the video signal by means of a band-pass filter 602f. A high-frequency component inside-light-measuring-area detecting circuit 602g detects the high-frequency component passing through the inside of the light measuring area B. A high-frequency component outside-light-measuring-area detecting circuit 602h detects the high-frequency component passing through an area around the area B. The position of the object C within the image plane A is determined on the basis of information on a difference between the values of the high-frequency component thus detected by the circuits 602g and 602h. More specifically, the circuit 602 operates as follows: The position of the light measuring area B within the image plane A is shifted upward, downward, to the left and to the right. Then, one position of the light measuring area B that gives the above stated high-frequency component difference between the inside and the outside of the area B in a maximum value (the largest value) among the varied positions is judged to be the position of the object C within the image plane A. The area B is thus shifted to the position of the object C by setting it at the position that gives the maximum difference value.

In accordance with the arrangement described in the foregoing, the embodiment judges the size and the position of the object C within the image plane A according to a difference in luminance or high-frequency component between the inside and the outside of the light measuring area B; and adjusts the size and position of the area B to these of the object C in accordance with the result of the judgment respectively. This gives an optimum exposure for the object C. Besides, the invented arrangement enables the embodiment to give a natural picture even in cases where a panning or tilting action is performed on the camera.

As described in the foregoing, in accordance with the arrangement of the embodiment: The detecting area is arranged to have the position and the size thereof variable within the image plane. A specific frequency component of the video signal is detected from the inside and outside of a detecting area for each of the varied positions thereof. Computation is performed to obtain information on a difference between the values of the specific frequency component obtained from the inside and the outside of the detecting area for every one of the varied positions and the varied size thereof. The position and the size within the image (sensing) plane of the object to be photographed is determined or judged from the computed difference information. Then, the position and the size within the image plane of the detecting area is controlled according to those of the object. The invented arrangement enables a light measuring area to have both the position and the size thereof adjusted to those of the object's image obtained on the image plane. Therefore, the embodiment is capable of always giving optimum exposures even when the size and the position of the object change within the image plane.

Figure 24:
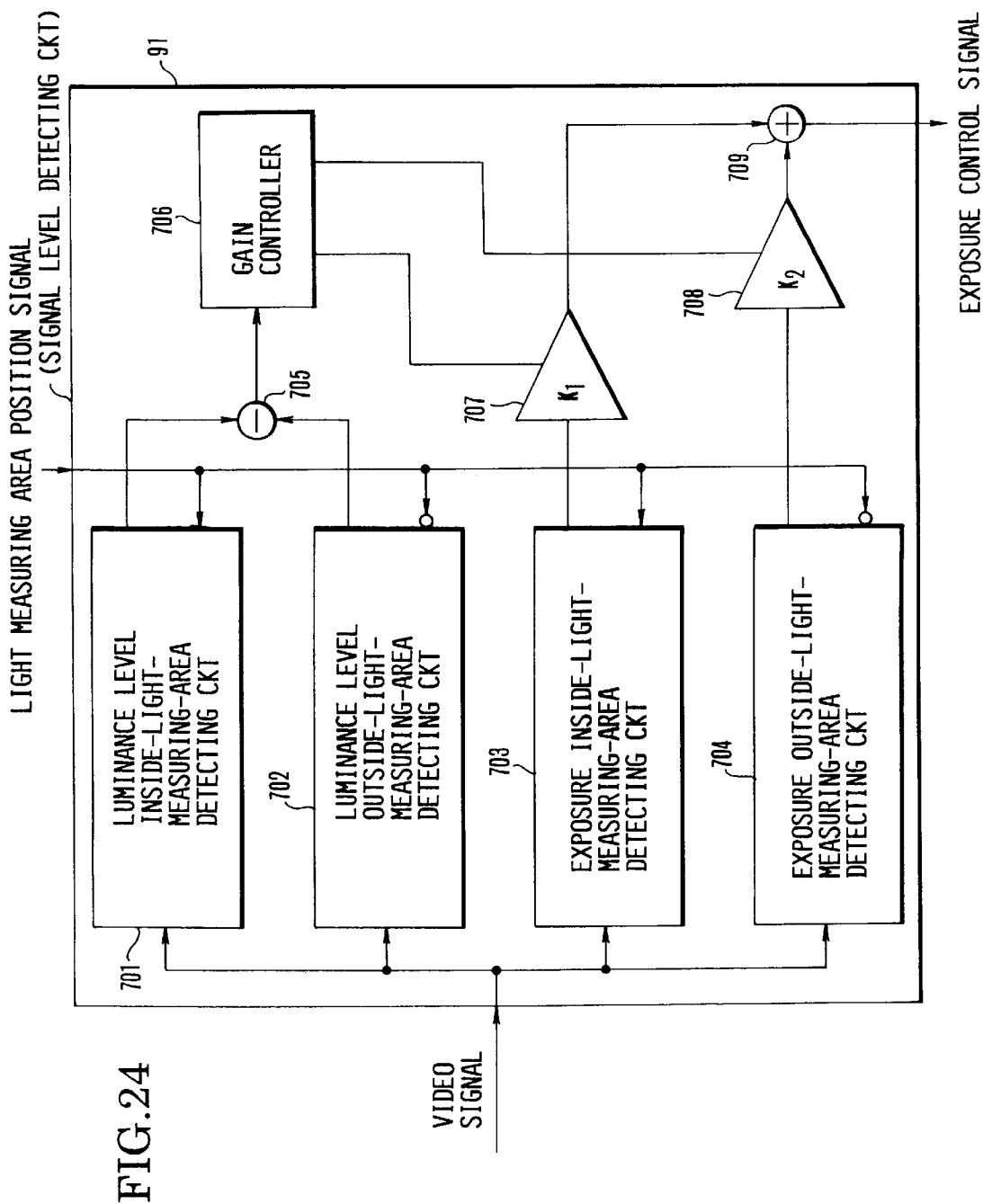
FIG. 24 is a block diagram showing a ninth embodiment of the invention wherein a signal level detecting circuit shown in FIG. 2 is differently arranged.

FIG. 24 shows a further embodiment of the invention. This embodiment is arranged to be capable of giving optimum exposures not only for the object but also for the whole image plane irrespectively of the position of the image within the image plane. The embodiment is as a whole arranged in the same manner as in the case of FIG. 2. A sole difference of this embodiment from the arrangement shown in FIG. 2 lies in the signal level detecting circuit 9. The embodiment has a signal level detecting circuit 91 arranged as shown in FIG. 24. Meanwhile, the light measuring area position control circuit 7 is arranged in the same manner as the circuit shown in FIG. 3 to trace the movement of the object in real time by shifting the light measuring area B to a position where the luminance level difference between the inside and the outside of the area B becomes a maximum value. Further, it goes without saying that the light measuring area position control circuit may be arranged as shown in FIG. 6 to use a difference in the high-frequency component of the video signal between the inside and the outside of the area B instead of the difference in luminance level.

In the case of the signal level detecting circuit 91 of FIG. 24, the circuit 91 is arranged to receive from the image sensor 3 the video signal passing through the full image plane as well as the light measuring area position signal coming from the above stated light measuring area position control circuit 7. Referring to FIG. 24, the signal level detecting circuit 91 includes a luminance level inside-light-measuring-area detecting circuit 701 which detects a luminance level obtained within the light measuring area B; a luminance level outside-light-measuring-area detecting circuit 702 which is arranged to detect a luminance level obtained in an area around the light measuring area B; an exposure inside-light-measuring-area detecting circuit 703 which is arranged to detect the exposed state of the light measuring area B; an exposure outside-light-measuring-area detecting circuit 704 which is arranged to detect the exposed-state of the area around the light measuring area B; a subtraction circuit 705 which is arranged to compute a difference in luminance between the inside and the outside of the light measuring area B; a gain controller 706 which is arranged to control the gain of each of signals produced from the exposure inside-light-measuring-area detecting circuit 703 and the exposure outside-light-measuring-area detecting circuit 704 according to a value obtained from the subtraction circuit 705; variable gain amplifiers 707 and 708; and an addition circuit 709.

The exposure inside-light-measuring-area detecting circuit 703 and the exposure outside-light-measuring-area detecting circuit 704 are arranged to compute and process average or peak values obtained from the above stated areas of the image plane respectively and produce signals required for exposure control. These signals are respectively supplied to the addition circuit 709 through the variable gain amplifiers 707 and 708. As a result, an exposure control signal is formed. Assuming that the output of the exposure inside-light-measuring-area detecting circuit 703 is expressed as M, the output of the exposure outside-light-masuring-area detecting circuit 704 as N, the gains of the variable gain amplifiers 707 and 708 as K1 and K2 and the exposure control signal as L, there obtains the following relation:

$$L = K1 \cdot M + K2 \cdot N$$

The gain controller 706 is arranged to change the weighted degrees of the outputs M and N by controlling the gains K1 and K2 according to the luminance difference between the inside and the outside of the light measuring area B. For example, the gain K1 is decreased to carry out exposure control taking into consideration information on the whole image plane if the luminance difference between the light measuring area B and the area around the area B is small. The gain K1 is increased to increase the weighted degree of information on the inside of the area B and exposure control is carried out with importance attached to the object in case that the luminance difference between is great indicating a high contrast state of the object.

The arrangement shown in FIG. 24 may be changed to have the luminance level outside-light-measuring-area detecting circuit 702 and the exposure outside-light-measuring-area detecting circuit 704 arranged to detect the luminance level of the whole image plane and the exposure of the whole image plane respectively.

Figure 25:
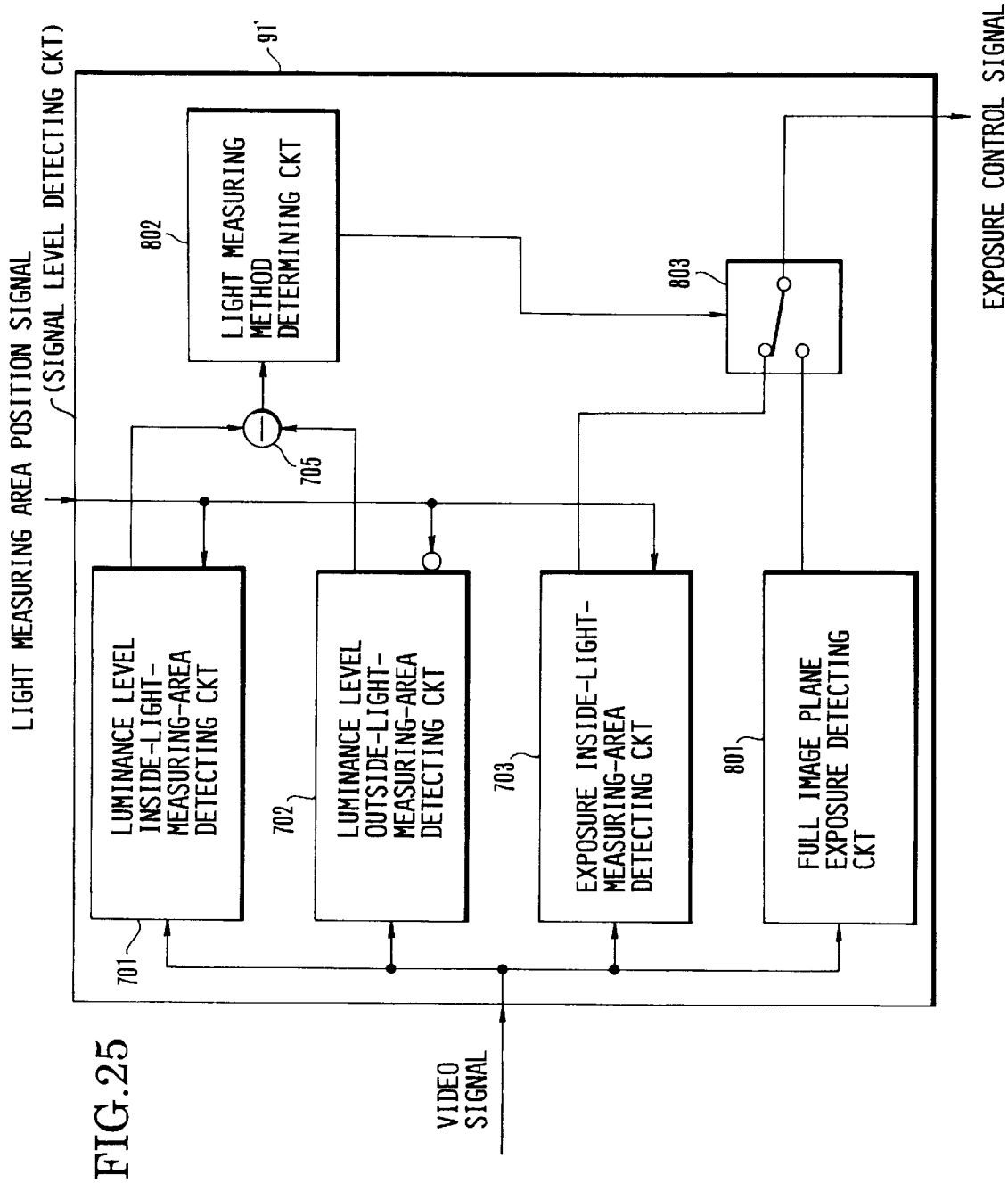
FIG. 25 is a block diagram showing a tenth embodiment of the invention wherein the arrangement of the signal level detecting circuit is further changed.

FIG. 25 shows a further example of arrangement of the signal level detecting circuit 91. In FIG. 25, the circuit 91 is indicated as a signal level detecting circuit 91'. The same parts as those of FIG. 24 are indicated by the same reference numerals. The circuit 91' includes a full image plane exposure detecting circuit 801; a light measuring method determining circuit 802; and a selection switch 803. The arrangement of FIG. 25 differs from that of FIG. 24 in the following point: The light measuring method determining circuit 802 is arranged to select via the switch 803 either the output of the exposure inside-light-measuring-area detecting circuit 703 or the output of the full image plane exposure detecting circuit 801 according to the luminance difference between the inside and the outside of the light measuring area B.

For example, the light measuring method determining circuit 802 selects the output of the full image plane exposure detecting circuit 801 via the switch 803 when the luminance difference between the inside and the outside of the light measuring area B is small indicating that the object's image is in a low contrast state. The circuit 802 selects via the switch 803 the output of the exposure inside-light-measuring-area detecting circuit 703 to adjust the exposure to the object if the luminance difference indicates a high contrast image. A threshold value for this selecting action is set within the light measuring method determining circuit 803.

The embodiment described is thus arranged to detect the position of the object C within the image plane A on the basis of a difference in luminance or high-frequency component between the inside and the outside of the light measuring area B; to allow the light measuring area B to trace the detected position of the object; and, on the basis of the luminance difference between the inside of the area B and an outside area around the area B or between the area B and the full image plane, to change the weighted degree of exposure information for these areas (the weighted degree is set at "0" for one of the areas in the case of the embodiment shown in FIG. 25). The embodiment is, therefore, capable of giving optimum exposures for the whole image plane as well as for the object C. In other words, natural pictures are obtainable even in cases where the object's image C moves or a panning or tilting operation is performed on the camera.

The exposure control device arranged according to the invention as described in the foregoing comprises: computing means for computing information on a difference in a specific frequency component between video signals obtained from the inside and outside of a detecting area which is movably set within an image plane; determining means for determining the position of a photographed object within the image plane on the basis of the difference information obtained from each of the different positions of the detecting area set within the image plane; light measuring area tracing means which sets a light measuring area at the position of the object determined by the determining means; exposure detecting means for detecting exposure information on the light measuring area, on another area or on the full area of the image plane including the light measuring area; weighting means which is arranged to compute information on a difference in the specific frequency component between the video signals obtained from the light measuring area and the other area or between the video signals obtained from the light measuring area and the full area including the light measuring area and to weight the outputs of the exposure detecting means produced for the different areas; and exposure control means for performing exposure control on the basis of computed values produced from the weighting means. With the device arranged in this manner, in the event of any change in the position of the object within the image plane, the light measuring area is shifted to the current position of the object. Further, a signal required for exposure control is formed on the basis of the information on the difference in the specific video signal frequency component between the video signals obtained from the current light measuring area and other area or between the video signals obtained from the light measuring area and the whole area of the image plane including the light measuring area. Therefore, the device is capable of giving optimum exposures for the whole image plane as well as for the object irrespectively of the object's position within the image plane.

It goes without saying that this embodiment may be arranged in combination with the embodiment which is arranged to vary the size of the light measuring area according to the object's image as shown in FIGS. 9 to 18 or in combination with the embodiment which is arranged to vary both the position and the size of the light measuring area as shown in FIGS. 19 to 23. Practical means for embodying such a combination will be apparent from the foregoing description.

What is claimed is:

1. A video camera device, comprising:
   (A) a photographing lens;
   (B) image pickup means for photoelectrically converting an image of an object formed by said photographing lens and for outputting an image signal;
   (C) extracting means for extracting a predetermined component from said image signal corresponding to a detecting area set in a picture plane;
   (D) movement detecting means for detecting a movement of the image of the object on the basis of the image signal in synchronism with a first period;
   (E) control means, in synchronism with a second period different from the first period, for controlling a position of the detecting area in said picture plane on the basis of an output of said movement detecting means; and
   (F) processing means, in synchronism with the first period for performing a predetermined process on the basis of the predetermined component out from said extracting means.

2. A device according to claim 1, wherein said movement detecting means is arranged to move said detecting area in an upward or downward direction or rightward or leftward direction at a period of a clock signal and to move the position of said detecting area in such direction that a difference of the luminance in said detecting area is increased.

3. A device according to claim 1, wherein the clock signal is a vertical synchronizing signal and said extracting means is arranged to output a luminance signal level at an outside of said detecting area, in addition to a luminance signal level at an inside of said detecting area, and further comprising exposure computing means including exposure compensating means which is arranged to evaluate the luminance signal level at the inside of said detecting area and the luminance signal level at the outside of said detecting area, to discriminate an object photographing state and to compensate exposure control information on the basis of information of the discrimination.

4. A device according to claim 1, wherein said processing means is an iris.

5. A device according to claim 1, wherein said processing means is an electronic shutter.

6. An image processing device, comprising:
  (A) image pickup means for photoelectrically converting an image of an object picked up by said photographing lens into an image signal and outputting said image signal;
  (B) extracting means for extracting a predetermined component of the image signal corresponding to a detecting area set in a picture plane;
  (C) detecting means, in synchronism with a clock signal, for detecting a movement of the image of the object in said picture plane;
  (D) control means arranged to set said detecting area at an approximately central portion of said picture plane in an initial state, to change the set position of said detecting area in said picture plane in every n times the clock signal on the basis of an output of said movement detecting means; and
  (E) exposure control means arranged to output exposure control information, in synchronism with the clock signal on the basis of an output of said extracting means and to control the diaphragm on the basis of said exposure control information.

7. A device according to claim 6, wherein the clock signal is a vertical synchronizing signal (V-sync) and said detecting means is arranged to move said detecting area in an upward or downward direction or rightward or leftward direction at a period of the V-sync and to move the position of said detecting area in such direction that a luminance difference in said detecting area is increased.

8. A device according to claim 6, wherein said extracting means is arranged to output a luminance signal level at an outside of said detecting area, in addition to a luminance signal level at an inside of said detecting area, and further comprising exposure computing means including exposure compensating means which is arranged to evaluate the luminance signal level at the inside of said detecting area and the luminance signal level at the outside of said detecting area, to discriminate a photographing state of the object and to compensate said exposure control information on the basis of information of the discrimination.

9. A video camera device, comprising;
  (A) image pickup means for converting an image to an image signal;
  (B) detecting means for performing a light detecting operation for detecting a level of the image signal corresponding to a detecting area set in an image screen;
  (C) movement detecting means in synchronism with a first period, for detecting a movement of said image in said image screen on the basis of the output of said detecting means;
  (D) control means, in synchronism with a second period longer than the first period for changing a position of the detecting area in said image screen on the basis of an output of said movement detecting means; and
  (E) exposure control means, in synchronism with the first period for computing exposure control information on the basis of the output of said detecting means and controlling an exposure on the basis of the exposure control information.

10. A device according to claim 9, wherein said movement detecting means is arranged to move said detecting area in an upward or downward direction or rightward or leftward direction at a period of a vertical synchronizing signal (V-sync) and to move the position of said detecting area in such direction that a difference of the luminance in said detecting area is increased.

11. A device according to claim 9, wherein said movement detecting means is arranged to move said detecting area in an upward or downward direction or rightward or leftward direction and to move the position of said detecting area in such direction that a level of a high frequency component in the image signal corresponding to an inside of said detecting area is increased.

12. A device according to claim 11, wherein said detecting means is arranged to output a luminance signal level at an outside of said detecting area, in addition to the luminance signal level at an inside of said detecting area, and further comprising exposure computing means including exposure compensating means which is arranged to evaluate the luminance signal level at the inside of said detecting area and the luminance signal level at the outside of said detecting area, to discriminate an object photographing state and to compensate said exposure control information on the basis of information of the discrimination.

13. A device according to claim 9, wherein said exposure control means includes an iris.

14. A device according to claim 9, wherein said exposure control means includes an electronic shutter.

15. An image processing device, comprising:
  (A) light detecting means for performing a light detecting operation by detecting luminance levels of an image signal corresponding to a detecting area set in an image screen;
  (B) detecting means, in synchronism with a first period, for detecting a movement of said image in said image screen;
  (C) area control means, in synchronism with a second period longer than the first period for changing a position of the detecting area in said image screen on the basis of an output of said movement detecting means; and
  (D) exposure control means, in synchronism with the first period for computing exposure control information on the basis of an output of said light detecting means and to control an exposure on the basis of the exposure control information.

16. A video camera device, comprising:
  (A) image pickup means for converting an image to an image signal;
  (B) detecting means for performing a light detecting operation by detecting a level of the image signal corresponding to a detecting area set in an image frame, in synchronism with a V-sync;
  (C) movement detecting means for detecting a movement of said image in said image frame, in synchronism with the V-sync on the basis of a change of an image signal component;

(D) control means for controlling a position of the detecting area in said image frame on the basis of an output of said movement detecting means, in synchronism with a period n times the V-sync; and (E) exposure control means, in synchronism with the V-sync for computing exposure control information on the basis of an output of said detecting means and controlling an exposure on the basis of the exposure control information.

17. A device according to claim 16, wherein said movement detecting means is arranged to move said detecting area in an upward or downward direction or rightward or leftward direction at a period of the vertical synchronizing signal (V-sync) and to move the position of said detecting area in such direction that a difference of the luminance between inside and outside of said detecting area is increased.

18. A device according to claim 16, wherein said movement detecting means is arranged to move said detecting area in an upward or downward direction or rightward or leftward direction and to move the position of said detecting area in such direction that a level of a high frequency component in the image signal corresponding to an inside of said detecting area is increased.

19. A device according to claim 16, wherein said detecting means is arranged to output a luminance signal level at an outside of said detecting area, in addition to a luminance signal level at an inside of said detecting area, and further comprising exposure compensating means which is arranged to evaluate the luminance signal level at the inside of said detecting area and the luminance signal level at the outside of said detecting area, to discriminate an object photographing state and to compensate said exposure control information on the basis of information of the discrimination.

20. A device according to claim 16, wherein said exposure control means includes an iris.

21. A device according to claim 16, wherein said exposure control means includes an electronic shutter.

22. An image processing method, comprising:

(A) photoelectrically converting step of an image of an object into an image signal and outputting said image signal;

(B) extracting step of extracting a predetermined component of the image signal corresponding to a detecting area set in a picture plane;

(C) detecting step of detecting a movement of the image of the object in said picture plane in synchronism with a clock signal;

(D) control step of setting said detecting area at an approximately central portion of said picture plane in an initial state, to change the set position of said detecting area in said picture plane in every n times the clock signal on the basis of an output generated in said detecting step; and (E) exposure control step of outputting exposure control information, in synchronism with the clock signal on the basis of an output of said extracting step and to controlling the diaphragm on the basis of said exposure control information.

23. A method according to claim 22, in said detecting step, said detecting area is moved in an upward or downward direction or rightward or leftward direction at a period of the clock and to move the position of said detecting area in such direction that a luminance difference in said detecting area is increased.

24. A method according to claim 22, in said extracting step a luminance signal level at an outside of said detecting area is output and in addition to a luminance signal level at an inside of said detecting area is output, and further comprising exposure computing step including exposure compensating step which evaluates the luminance signal level at the inside of said detecting area and the luminance signal level at the outside of said detecting area, to discriminate a photographing state of the object and to compensate said exposure control information on the basis of information of the discrimination.

25. A method according to claim 22, wherein said clock signal is a vertical synchronizing signal (V-sync).

* * * * *

UNITED STATES PATENT AND TRADEMARK OFFICE
CERTIFICATE OF CORRECTION

PATENT NO.    : 6,124,891
DATED         : September 26, 2000
INVENTOR(S)   : Homma et al.

It is certified that error appears in the above-identified patent and that said Letters Patent is hereby corrected as shown below:

Column 10,
Line 54, delete "su.h" and insert -- such --.

Column 13,
Line 35, delete "AL" and insert -- ΔL --.

Column 17,
Line 34, delete "operate-in" and insert -- operate in --.
Line 35, delete "the.operation" and insert -- the operation --.

Signed and Sealed this

Twenty-first Day of January, 2003

JAMES E. ROGAN
*Director of the United States Patent and Trademark Office*